United States Patent [19]
Dinkins

[11] Patent Number: 5,854,793
[45] Date of Patent: *Dec. 29, 1998

[54] GPS SYNCHRONIZATION OF CTS TRANSMITTERS FOR AN INTERACTIVE NETWORK

[75] Inventor: Gilbert M. Dinkins, Herndon, Va.

[73] Assignee: EON Corporation, Reston, Va.

[*] Notice: The term of this patent shall not extend beyond the expiration date of Pat. No. 5,388,101.

[21] Appl. No.: 607,814

[22] Filed: Feb. 27, 1996

Related U.S. Application Data

[63] Continuation of Ser. No. 257,336, Jun. 8, 1994, abandoned, which is a continuation-in-part of Ser. No. 966,414, Oct. 26, 1992, Pat. No. 5,388,101.

[51] Int. Cl.[6] .............................. H04N 7/56; H04N 7/14
[52] U.S. Cl. ..................... 370/503; 370/517; 375/356; 348/13
[58] Field of Search .................... 370/270, 271, 370/310, 312, 313, 314, 315, 316, 319, 324, 327, 328, 329, 331, 332, 334, 343, 344, 437, 480, 487, 503, 516, 518, 519; 375/362, 356, 365, 371; 455/3.1, 3.2, 4.1, 5.1, 6.1, 31.3, 15, 16; 348/6, 7, 12, 13

[56] References Cited

U.S. PATENT DOCUMENTS

| | | |
|---|---|---|
| 4,481,670 | 11/1984 | Freeburg . |
| 4,525,861 | 7/1985 | Freeburg . |
| 4,545,071 | 10/1985 | Freeburg . |
| 4,550,443 | 10/1985 | Freeburg . |
| 4,750,036 | 6/1988 | Martinez . |
| 4,875,038 | 10/1989 | Siwiak et al. .......................... 455/31.3 |
| 5,245,634 | 9/1993 | Averbuch ............................... 370/324 |
| 5,287,550 | 2/1994 | Fennell et al. ......................... 455/51.2 |
| 5,351,146 | 9/1994 | Chan et al. ............................ 370/69.1 |
| 5,416,797 | 5/1995 | Gilhousen et al. .................... 370/209 |

*Primary Examiner*—Huy D. Vu
*Attorney, Agent, or Firm*—Intellectual Property Group of Pillsbury Madison & Sutro LLP

[57] ABSTRACT

A two-way communication network for routing communications from and to a plurality of subscriber units at various geographic locations. The network includes a plurality of low power local subscriber units adapted to transmit and receive digital data messages of variable lengths and a central transmitter station (CTS). The CTS includes data transmission and data reception facilities. The transmission facilities transmit messages to the local subscriber units and include a synchronization unit that synchronizes the transmission facilities with a precision clock signal. The data reception facilities receive and process messages from the subscriber units. Remote receiver units are dispersed over the geographic area served by the CTS and relay digital messages transmitted from the subscriber units to the CTS. Each subscriber unit communicates with the CTS by way of digital data signals synchronously related to said precision clock signal and timed for multiplexed message transmission.

36 Claims, 14 Drawing Sheets

|  | BASE STATION 100 | BASE STATION 102 |
|---|---|---|
| BROADCAST | F1 | F2 |
| REMOTE RECEIVER |  |  |
| SETUP | F1 | F2 |
| DATA | F2 | F3 |
| • | F3 | F4 |
| • | • | • |
| • | • | • |
| • | • | F14 |
| • | F14 | F1 |

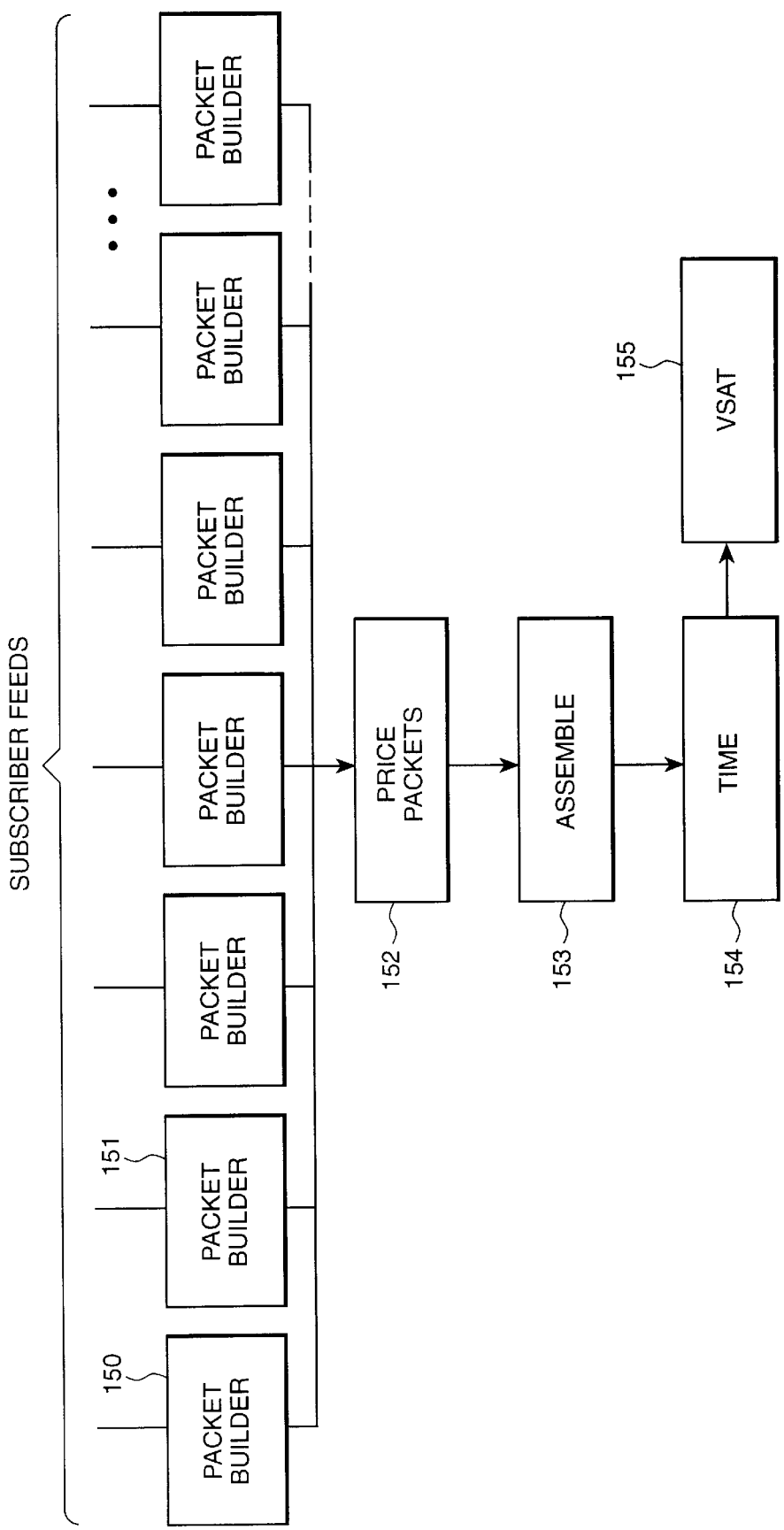

PROPOGATION TIME: 5.3 μsec PER MILE

X = T₀ + PROCESSING TIME
Y = LINK DELAY BETWEEN INTERMEDIATE
    RECEIVER AND BASE STATION

GPS SYNCHRONIZATION OF CTS TRANSMITTERS FOR AN INTERACTIVE NETWORK

This is a continuation of application Ser. No. 08/257,336, filed on Jun. 8, 1994, which was abandoned upon the filing hereof, which is a continuation-in-part of application Ser. No. 07/966,414 filed on Oct. 26, 1992, which issued as U.S. Pat. No. 5,388,101.

BACKGROUND OF THE INVENTION

1. Field of the Invention

This invention relates to an interactive two-way data service network, and more particularly, to an interactive two-way data service network which is precisely synchronized throughout the network with a Global Positioning System (GPS).

2. Prior Art

A wireless interactive video system disclosed in U.S. Pat. No. 4,591,906, May 27, 1986, by Fernando Morales-Garza, et al. provides for real time interactive digital communication from a large audience of subscribers in urban areas in the vicinity of a central television transmitting station.

The Federal Communications Commission (FCC) has now established in the U.S.A. communication standards for such interactive video data service allocating wireless transmissions in the 218–219 MHz band for FCC licensing for public use in assigned local CTS areas authorizing low power subscriber interaction units of maximum effective radiated power under twenty watts.

Wireless interactive video data service is provided without telephone lines or cable systems over a nationwide network of CTSs in the manner disclosed in U.S. Pat. No. 5,101,267, Mar. 31, 1992, Fernando Morales, by way of satellite transmissions between local area CTSs and a data center with a wireless connection being provided to responding units, or remote transmitter units (RTU) and the local area CTSs.

This nationwide communication capability permits live video programs viewed nationwide, such as world series baseball games, to become interactive for individual subscriber participation. Thus, mass communications over a substantially real time communication system with such large urban area audience participation that would jam any existing public telephone switching network capability are made feasible.

Each local CTS in such a nationwide communication system must be capable of interacting within designated license restrictions in the presence of peak local audience participation without significant switching delays to establish substantially real time interactive two-way connections over a network processing an audience of very large numbers of participants wishing to communicate substantially simultaneously.

Prior art two-way radio transmission network technology, as represented for example by portable telephone communication systems, is generally incompatible with efficient substantially real time communication in the presence of heavy subscriber activity. This occurs because in telephone systems switching and connection operations must be made compatible with switching instructions from subscriber instruments with coded audio tones at audio frequencies accompanying analog audio messages. Thus with long numeric identification numbers for nationwide long distance connections, typically of ten decimal digits, which must be manually entered while busying lines to complete point-to-point connections as a part of the interconnecting signal data, switching circuits are engaged for very long periods of time inconsistent with substantially real time connections or heavy traffic conditions. Accordingly, busy signals are encountered often to restrict the size of a participating audience for immediate connection and the follow-up contention for a line requiring re-dialing is frustrating to the potential using audience. Thus, interactive response that requires telephone exchange communications tends to be delayed and discouraging to participants, and introduces the critical problem of identifying and communicating interactively between subscribers in real time without jammed exchanges and the frustration of encountering busy signals and starting over with a new attempt to communicate.

Similarly, even with the restricted amount of digital data that might be transferred in digital paging system messages, where typically some messages only indicate a short fixed length message such as a calling telephone number, there is little possibility of approaching real time communications in the presence of heavy traffic because of the complexities of the necessary telephone switching networks employed for conveying messages.

In order to process digital information accurately, efficiently, and privately, it is necessary to precisely time and organize the digital data and accompanying commands. For real time two-way digital communications with large audiences wanting prompt access to the message conveyance system or network, synchronous signal timing becomes critical and absolutely necessary for real time interactive communication. In general, audio telephone communications are of an analog nature not critical to timing and are conveyed asynchronously. Thus, prior telephone art signal communication systems are unsuited for adoption in interactive video data systems that convey private point-to-point digital messages on a real time basis for large audiences.

A co-pending patent application Ser. No. 07/966,414, filed Oct. 26, 1992, by G. Dinkins, entitled "Interactive Nationwide Data Service Communication System For Stationary And Mobile Battery Operated Subscriber Units" discloses a two-way interactive communication network. The system disclosed in that application includes a network switching center and provides point-to-point communications between subscribers units at different geographic locations. The network switching center, or hub, is connected via satellite links to a plurality of local CTSs. The local CTSs communicates over an RF link with a number of low-power subscriber units. The low-power subscriber units, are, for example, battery-operated mobile units. The local subscriber units, or RTU's, for this system are each located in the vicinity of a CTS. The local RTUs are adapted for synchronous time-division-duplexed receipt and transmission of digital messages. The digital messages are transmitted to and from the local RTUs through different paths.

For transmitting digital messages to a RTU from a local base station, or central transmitter station (CTS), the digital messages are transmitted at relatively high power (in the tens of watts range) from a local CTS to the local subscriber unit, or RTU's. For transmitting digital messages from a local RTU to a local CTS, inexpensive, low-power, mobile, small-sized, local subscriber units, or RTU's are utilized. Digital messages are transmitted from these low-power RTU's at relatively low power (in the milliwatt range) to the CTS using an intermediate set of remote receiver units. The low-power subscriber RTU units transmit at milliwatt power levels and the system incorporating such low-power, milliwatt RTUs is called a Milliwatt System.

The intermediate remote receiver units are distributed around a local CTS. The remote receiver receives messages from various low-power subscriber RTU's and communicate with the data processing facility of a CTS using, for example, a wired communication link such as a cable. Messages are compiled as data packets in the data processing facility of the CTS and relayed via satellite links to the network switching center. The Milliwatt System uses time division duplex (TDM) for the outbound signals transmitted from the local CTS to the local RTUs and for the inbound signals transmitted from the local RTUs to the remote receivers located around the local cell sites. Transmissions in the system alternate between outbound signals and inbound signals.

To provide adequate signal coverage, this type of system is designed such that two adjacent CTS cell sites have certain common coverage areas with overlapping signal coverage. These coverage-overlap areas between two adjacent CTS cell sites receive signals of approximately equal signal strength from both of the CTS cell transmitters. Because time division multiplexing is used to separate the two transmitting functions, it should be appreciated that the timing between the transmitting and receiving time slots is very important to prevent interference. The prior system discussed has a timing accuracy of 50 milliseconds±20 milliseconds. If both CTSs are allowed to transmit in a relatively random fashion, it is likely that one base cell site may be transmitting on a given frequency while an adjacent CTS is attempting to listen to responses from its local subscriber RTU units on the same frequency. This situation causes interference between the two adjacent systems.

Consequently, the need has arisen for a better way of synchronizing an interactive two-way data service to prevent interference between operations in adjacent cell sites.

SUMMARY OF THE INVENTION

It is therefore an object of the invention to provide an improved technique for synchronizing a two-way interactive communication network.

It is another object of this invention to provide synchronously timed digital communication signals of fixed length between geographically separated CTSs and subscribers of an interactive video data service system.

In order to reduce interference and to maximize the reuse of Milliwatt channel frequencies, all of the CTSs are synchronized together using a Global Positioning System (GPS) to provide a very precise time stamp at each CTS. With a system according to the invention, accuracy of 1 to 4 microseconds is achieved.

Using the Global Positioning System (GPS), a precise time signal, or time stamp, is made locally available at each CTS to synchronize a system according to the invention. By synchronizing the start-of-transmission time for all of the CTSs in the system, interference is avoided. The signaling protocol for a system according to the invention used time-division-duplexing. In the Broadcast Mode, an outbound signal sends information from a network switching center, or hub, via a satellite link to a CTS, and then to a RTU. In the Response Mode, an inbound signal sends response information from a RTU to a remote receiver, then to a CTS, and then via a satellite link back to the switching center, or hub.

RTUs located in the region of overlapping coverage, which are located between two CTSs, receive signals of approximately equal strength from each of the CTSs. If each of the CTSs is permitted to randomly start their broadcast transmissions, interference results if one CTS is in the Broadcast Mode and if the other CTS is in the Response Mode attempting to listen to a response from a RTU on the same frequency. The precise time stamp made locally available at each CTS by the GPS system is used to accurately synchronize the various CTSs of a system according to the invention.

The invention relates to a technique for synchronizing central transmitter stations (CTS) for a two-way communication interactive video network. A network hub switching center routes communications from and to a plurality of remote transmitter units (RTU) at various geographic locations. A central transmitter station (CTS) transmits data to the RTU's. The CTS also processes digital data modulated on an r-f carrier and transmitted from a plurality of RTU's dispersed over a predetermined CTS geographic area. The RTU's present multiplexed digital data which is synchronously related to the CTS broadcast signal for communication from identified individual RTU's within designated geographic service areas. The invention provides (CTS) data processing and transmission facilities for transmitting to a set of local RTU's and for receiving from a subset of those local RTU's multiplexed synchronously related digital data messages of variable lengths using intermediate remote receiver units which are remotely located from the CTSs.

An important aspect of the invention is that the CTS data processing and transmission facilities include means for synchronizing the transmission facilities with a precision clock signal derived from an independent precision clock source wherein the two-way communication interactive video network operates in conjunction with a source of video signals and wherein said CTS data processing and transmission facilities includes means for synchronizing said transmission facilities with a precision clock signal which is derived from a precision clock source, which clock source is independent of said video signals. While the interactive video network operates in conjunction with a source of video signals, the clock source is independent of the video signals. The system includes means for providing the precision clock signal from a Global Positioning System (GPS) network to provide precision timing for said CTS transmission facilities, including means for receiving signals from a Global Positioning System (GPS) satellite system to provide the precision clock signal for precision timing of the CTS transmission facilities.

A number of intermediate remote receivers are provided with each CTS. These are used for receiving and processing data messages for local RTU's near that CTS. The remove receivers are located at a set of cell subdivision sites, which are partitioned from the CTS geographic area and are dispersed over the CTS geographic area. Each cell subdivision site is adapted for reception only of low power digital messages transmitted from RTU's within range of the partitioned cell site areas.

A set of RTU's includes low power mobile units located within the CTS geographic area and each are adapted to communicate with a CTS through the intermediate remote receivers by way of digital data signals synchronously related to the precision clock signal and timed for multiplexed message transmission.

The CTSs and RTUs operate in a band of carrier frequencies between 218–219 MHz. Each of the local RTUs is individually identified by reception and transmission of digital address signal pulses in a predetermined timing relationship synchronized with the precision clock signal. The CTSs and RTUs hand-off a communication message for transmission over a path through a single one of the cell subdivision receive-only stations. The RTUs transmit on a plurality of frequencies, and the receive-only intermediate receivers at different subdivision sites operate on different ones of said frequencies within the 218–219 MHz band.

A plurality of CTSs are provided in the network according to the invention. The CTS transmission facilities are synchronized with a precision clock signal derived from an independent precision clock source such as a Global Positioning System (GPS) network to provide precision timing for the CTS transmission facilities.

An interactive video data system includes subscribers with mobile RTUs and facilities for communicating from the RTUs when moved through different geographic zones. The CST for a defined geographic area serves a set of RTU'S, or subscriber units. The area is subdivided into a plurality of zones and a number of receive-only intermediate remote receivers are located in each zone for reception of transmissions from RTU's located in the respective zones. Each CTS includes means for synchronizing its transmission facilities with a precision clock signal derived from an independent precision clock source, such as GPS system. Facilities are provided in the CTS and RTU's for handing off communications between zones when communicated signals deteriorate below a given threshold. While the two-way communication interactive video network operates in conjunction with a source of video signals, the precision clock signal is derived from a precision GPS clock source which is independent of the video signals. Messages are transmitted from the different subdivided cell areas on different carrier frequencies in the range of 218–219 MHz. Each of the RTU's receives and transmits using a predetermined timing scheme synchronized with a precision clock signal.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 11 is a diagrammatic sketch of message frames for illustrating the maximization of data processed at local cell sites.

DETAILED DESCRIPTION OF THE PREFERRED EMBODIMENTS OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
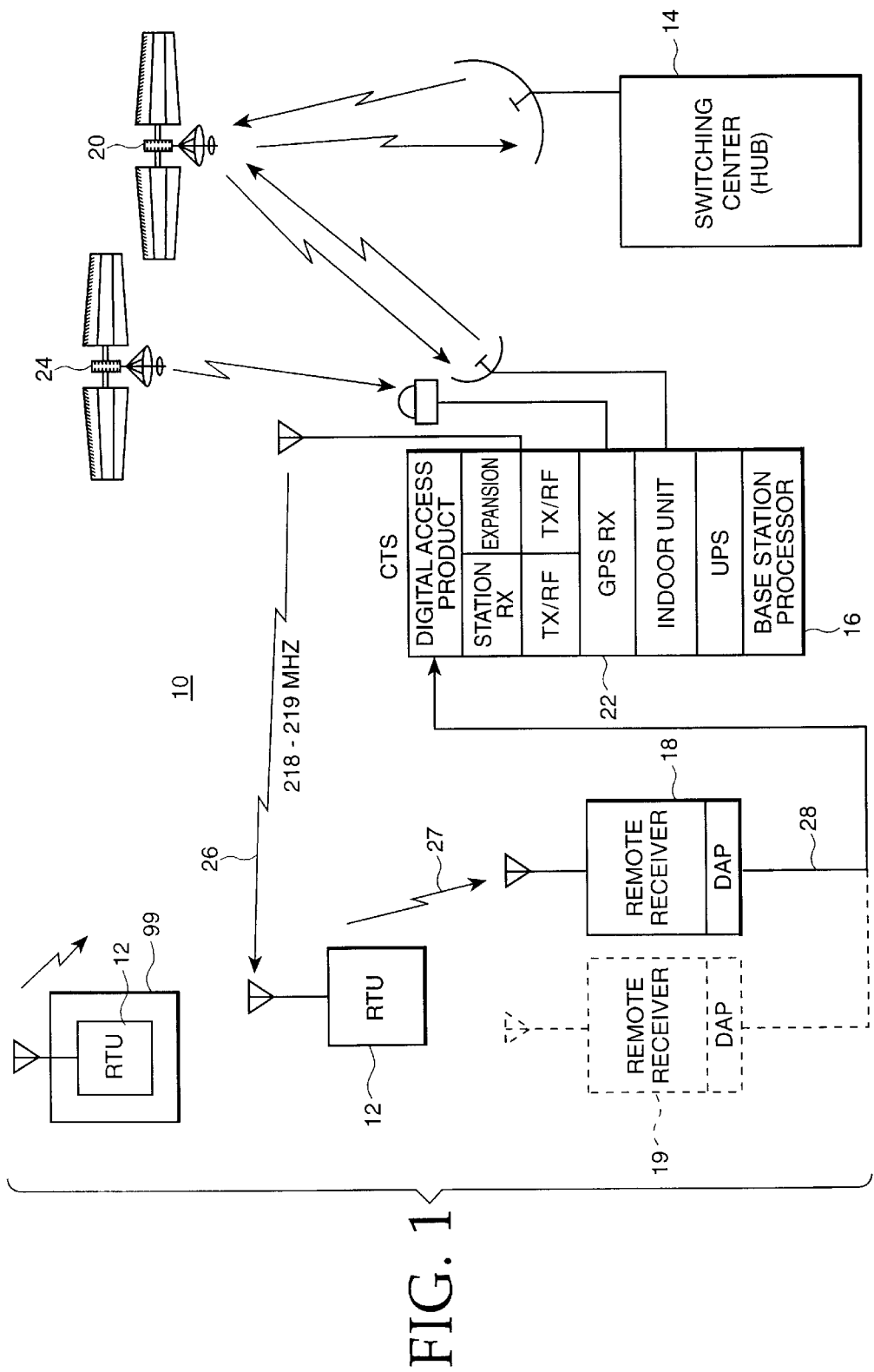
FIG. 1 is a block diagram of an interactive video data satellite system which provides point-to-point communications between RTUs in local service areas and a national hub.

FIG. 1 shows a block diagram of an interactive video data system 10. This system 10 provides point-to-point communications between a number of RTUs, typically shown as 12, and a national switching center, or hub, 14. The RTUs 12 may be stationary units or mobile units. The system 10 includes a number of geographically distributed CTSs 16 each having several adjacently located remote receiver units 18, 19. The CTS 16 has two-way communication with the switching center 14 via two-way satellite links to a satellite 20. The CTS 16 includes data and switching control capabilities.

Information is transmitted to and from a RTU 12 using two different signal paths. The CTS 16 transmits information to the RTU 12 using a 218–219 MHz RF link 26. The RTU 12 transmits information back to the CTS 16 using a remote receiver unit 18. The RTU 12 transmits information to the remote receiver unit 18 using another 218–219 MHz RF link 27. The power level of the transmitter of the RTU 12 is in the milliwatt range. The remote receiver unit 18 then transmits the information to the CTS 16 using, for example, a hard-wired date link 28. The CTS 16 then communicates the information receiver from the RTU 12 to the switching center 14 via the satellite 20.

A reference co-pending patent application Ser. No. 07/966,414, filed Oct. 26, 1992, by G. Dinkins, entitled "Interactive Nationwide Data Service Communication System For Stationary And Mobile Battery Operated Subscriber Units" is incorporated herein by reference as background material to the extent necessary for providing a full disclosure of operating details. This reference discloses a two-way interactive communication network which uses RTUs having milliwatt transmitter output power. The basic operation of this type of interactive system is set forth in U.S. Pat. Nos. 4,591,906 and 5,101,267. Details of point-to-point switching and communication throughout the system identified at switching and control center 14 and an accompanying terminal directory, downloading of data and software from the control center, the processing of billings and transactions, and the corresponding interaction of the memory and software at the RTU 12 are set forth in co-pending applications Ser. No. 07/889,626, May 28, 1992 for Software Controlled Interactive Video Network and Ser. No. 07/932,241, Aug. 19, 1992 for Interactive Satellite Broadcast Network, which are also incorporated hereinto by reference as background material to the extent necessary for providing a full disclosure of operating details.

Figure 2:
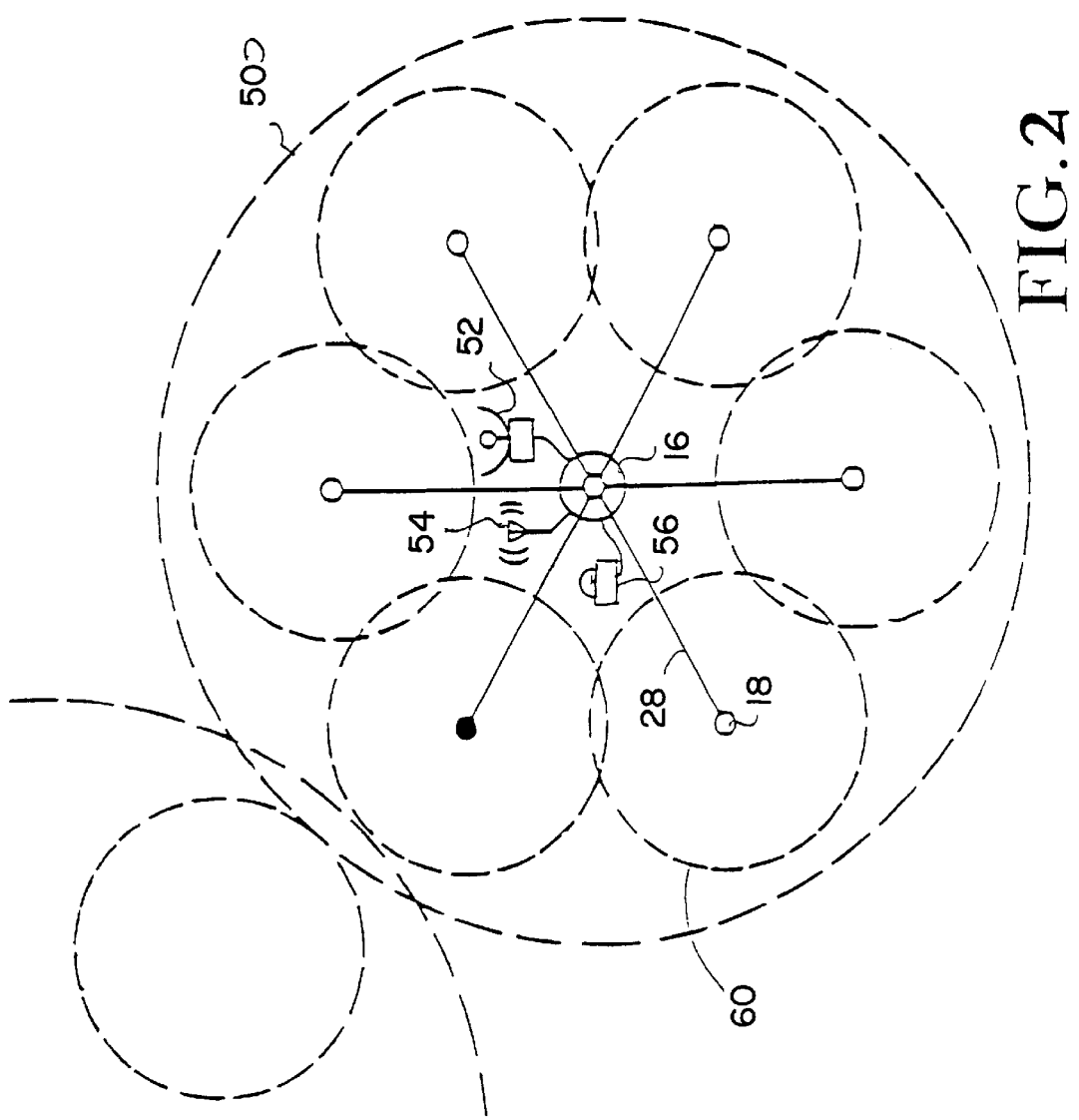
FIG. 2 is a diagram showing the location of remote receivers around a cell CTS.

With reference to FIG. 2, an embodiment is diagrammatically shown of an explicit CTS 16 site, afforded by this invention, which expands the interactive capabilities and functions of the subscriber response units 12 while improving performance and reducing cost. The outer dotted ring 50 outlines the limits of a local CTS 16 site, such as may be licensed by the FCC for interactive video data service. The CTS 16 site local area repeater station communicates with the satellite system via a directed dish antenna 52, and transmits digital communication signals and TV video overlay trigger signals to a set of subscribers throughout the assigned territory within the dotted boundary ring 50 by way of an antenna 54. Another antenna 56 receives GPS signals from GPS satellites to provide precision time signals for the CTS 16.

A set of typically 14 remote, receive-only, fixed-location relay stations 18 are positioned at strategic locations within the CTS 16 cell area defined by the ring 50. Each remote receiver station 18 is connected by cable, RF link or leased telephone line 22 to the CTS 16. Thus, transceiver RTUs 12, etc., located within a subdivided response zone 60 communicate with the remote receivers 18 over a significantly reduced transmission path distance within the subdivided response areas 60, as compared with direct transmission to the cell site 16. This subdivision feature, accordingly for the first time in interactive video data system provides for reliable transmission at radiated power levels in the milliwatt region. Distinct advantages result including less chance for external interference and long life battery operated mobile RTUs 12 which can be moved throughout the cell territory defined by the ring 50.

Up to 14 remote receiver units 18 are used per CTS 16. Each receiver unit 18 has a subdivided response zone 60 with a radius of one mile. The subdivided response zone 60 can contain 5000 households, which can have RTUs. The data rate from the CTS 16 to a RTU 12 in a subdivided response zone 60 is 10 kilobits per second. The data rate from a RTU to a remote receiver unit 18 is 5.1 kilobits per second. The data rate from the CTS 16 to the satellite 20 is 512 kilobits per second and the data rate from the satellite 20 to the CTS 16.

Accordingly, this invention encourages such additional interactive services in the network as typified by meter reading, and inventory control in soft drink dispensing machines, etc. in a manner saving so much manpower and expense as to be viable economically in this type of interactive video data service system. In the latter two examples, very simple digital communication RTUs 12 may be provided in a vending machine 99 (see FIG. 1) without the necessity for video displays, in the manner later described. Other examples are site alarms for remote monitoring of open doors, fires, failure, temperature, etc. Two-way paging services are also thus made available, or telemeter in location or condition of delivery trucks, etc. Furthermore, with full service video display TV installation at a subscriber station 12, the feasibility of moving such remote units to different locations in a house, office, or car is established. Accordingly this invention is in part directed to the provision of portable or mobile interactive subscriber stations and communication units for interactive video data service systems compatible with FCC standards. With the lower power transmitters provided, adjustments of transmitter power in the RTUs is provided by the CTS based on the Received Signal Strength at the Remote Receiver. Smaller and mobile RTU's are also possible. There is considerable advantage of longer battery life for mobile units.

A further substantial advantage to the invention is the ability to handle point-to-point connections nationwide under peak traffic conditions with very little subscriber waiting time for access to the system.

Figure 3:
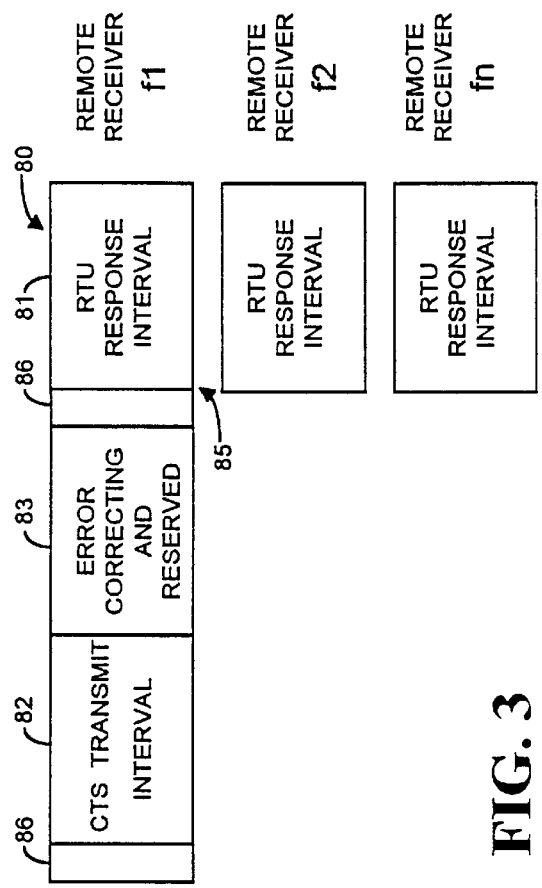
FIG. 3 is a chart form illustrating the system protocol for reception of messages and response at the RTU's.

FIG. 3 illustrates in chart form the system protocol for reception of messages and response at the RTU's. A large number, typically 14, of subscribers can be simultaneously using the system at any CTS site. Thus assume that each of 14 fixed remote receiver stations within the cell area is capable of processing one on-air RTUs at a time. Typically, in operation of an intermediate remote receiver unit 18, 10 RTUs complete their communications in one second. In a CTS handling 14 receiver units, 140 RTUs can thus complete their communications in one second. This results because the milliwatt powered RTUs 12 are adapted for transmission in a single one of the 14 subdivided areas or zones, with provisions for preventing interference with adjacent zones, as described herein below.

Other system advantages are: (1) that low power subscribers use the system at outer cell boundaries, thereby reducing chances for inter-cell interference, (2) that the expansion of the system may occur by adding subdivided zones as the subscriber base grows, (3) that the passive remote receive-only receivers have no problems in meeting FCC interactive video data service conditions, (4) and that capital, power and operating costs substantially decrease.

To transmit with ten RTUs in the respective zones, the protocol assigns a timed broadcast period 80 to a subscriber, or home, unit (HU), RTU having a response at an accumulated 6.4 kilo baud response rate. Each of these switched-in user home units then transmits a digital message superimposed by modulation on the 218–219 MHz band sub carrier. The broadcast time interval 82 permits the cell site transmitter to broadcast a message including a (ringing) signal that may include an address code number for activating a single home unit within the cell area. Each home unit has a built in address code that must be used to activate that unit, and the central data switch control unit maintains a directory of all such numbers in the nationwide network. The broadcast time interval 83 provides a time gap for checking errors and for providing desirable control signals. Guard gaps 86 are supplied between successive broadcast periods, where these broadcast periods are also identifiable as RF frames.

The RF frames permit transmission at 6.4 Kilo baud for each of say 14 subdivisions 60. Thus the cell stores in a buffer the 14 multiplexed home unit data rates to load the buffer at a 71 Kilo baud rate. A total data rate for the main cell area is 71 Kilo baud from the 14 simultaneous responses from the separate subdivisions 22. Assuming no errors and 50 byte messages from each home unit, with 6,000 home units trying to get their message through 14 channels, the waiting time for a "line" would be less than one minute without contention, minimizing the necessity of "redialing".

The legends in the right hand column show that each remote receiver station is assigned a corresponding communication frequency band, $f1-f_n$, thereby isolating the communications from RTUs in each subdivision within the cell area. The length of the RF frames 80 is 100 milliseconds including a guard band 86 to switch the hardware from receive mode to transmit mode or from transmit mode top receive mode.

Figure 4:
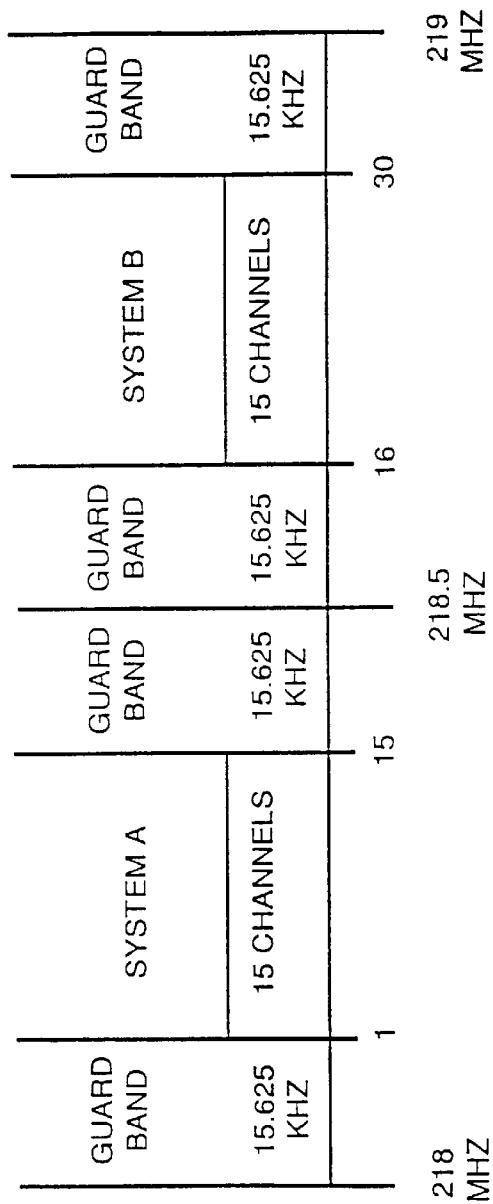
FIG. 4 is a diagram showing the allocation of frequencies for transmission from a cell CTS to RTUs.

FIG. 4 is a diagram showing the allocation of frequencies for transmission from a cell CTS to RTUs. This diagram sets forth the FCC approved bands for licensed interactive communications, thus allocating fifteen channels, each having a bandwidth capable of carrying the messages under the conditions described herein.

Figure 5:
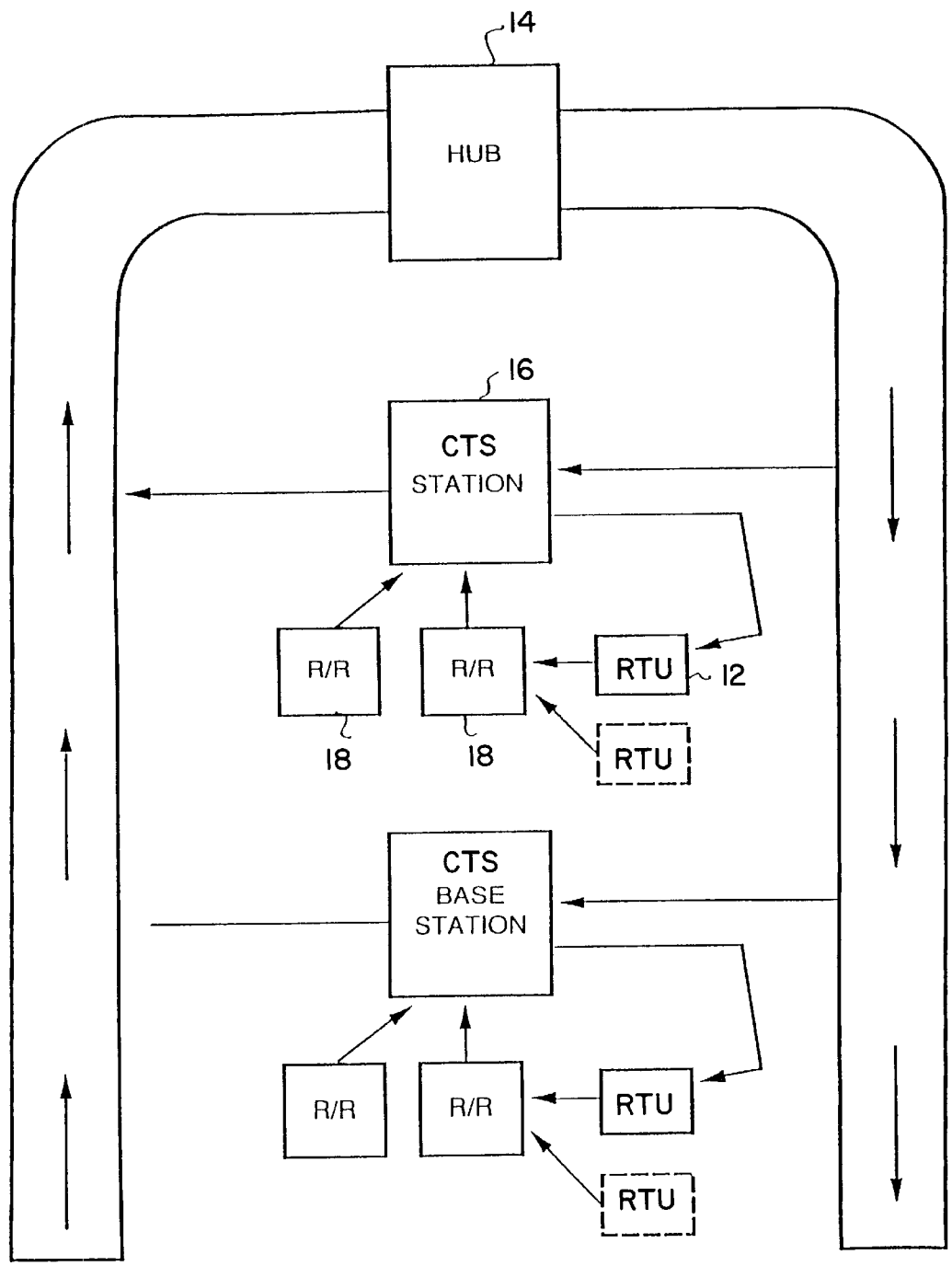
FIG. 5 is a diagram showing the architecture and signal flow for a system including a hub, CTSs, remote receivers, RTU's, or personal digital assistants (PDAs).

FIG. 5 shows an architecture and signal flow diagram for an interactive two-way data network system including a hub 14, CTSs 16, remote receivers 18 and RTU 12, Signaling for this system is based on the TCP/IP suite of protocols developed by the U.S. Department of Defense. These protocols are the Transmission Control Protocol (TCP) and the Internet Protocol (IP). Multiple layers are provided, depending upon particular applications. The RF layer uses a front end computer to provide certain processing tasks. The RF layer also incorporates FEC to correct bit errors. Multiple access to the network with maximized throughput of data is obtained through requests for reservations via a setup channel. Automatic retry occurs at random intervals if a request is not acknowledged.

Again with reference to FIG. 5, the data rate from the hub 14 through the satellite 20 to the various CTSs 16 is 512 kilobits per seconds. The data rate from the various CTSs 16 through the satellite 20 to the hub 14 is 128 kilobits per second. Transmissions of data from the hub 14 to individual CTSs 16 use the TCP/IP protocols at data rates of 10 kilobits per second and higher. Transmissions of data from the CTSs 16 to the hub 14 use the TCP/IP protocols at data rates of 30 kilobits per second and higher. Transmission of data from the CTSs 16 to a subscriber, or RTU, 12 in a subdivided response zone 60 are at a 12 kilobit per second rate. Transmissions of data from the RTU 12 to a remote receiver unit 18 is at a rate of 6.4 kilobits per second. Transmission of data from the remote receiver unit 18 to the CTS 16 on a dedicated data link also use the TCP/IP protocols. The data rate from the CTS 16 to a RTU 12 is 12 kilobits per second and uses the TCP/IP protocol and an RF protocol for the FCC communication standards for interactive video data service allocating wireless transmissions in the 218–219 MHz band.

Figure 6:
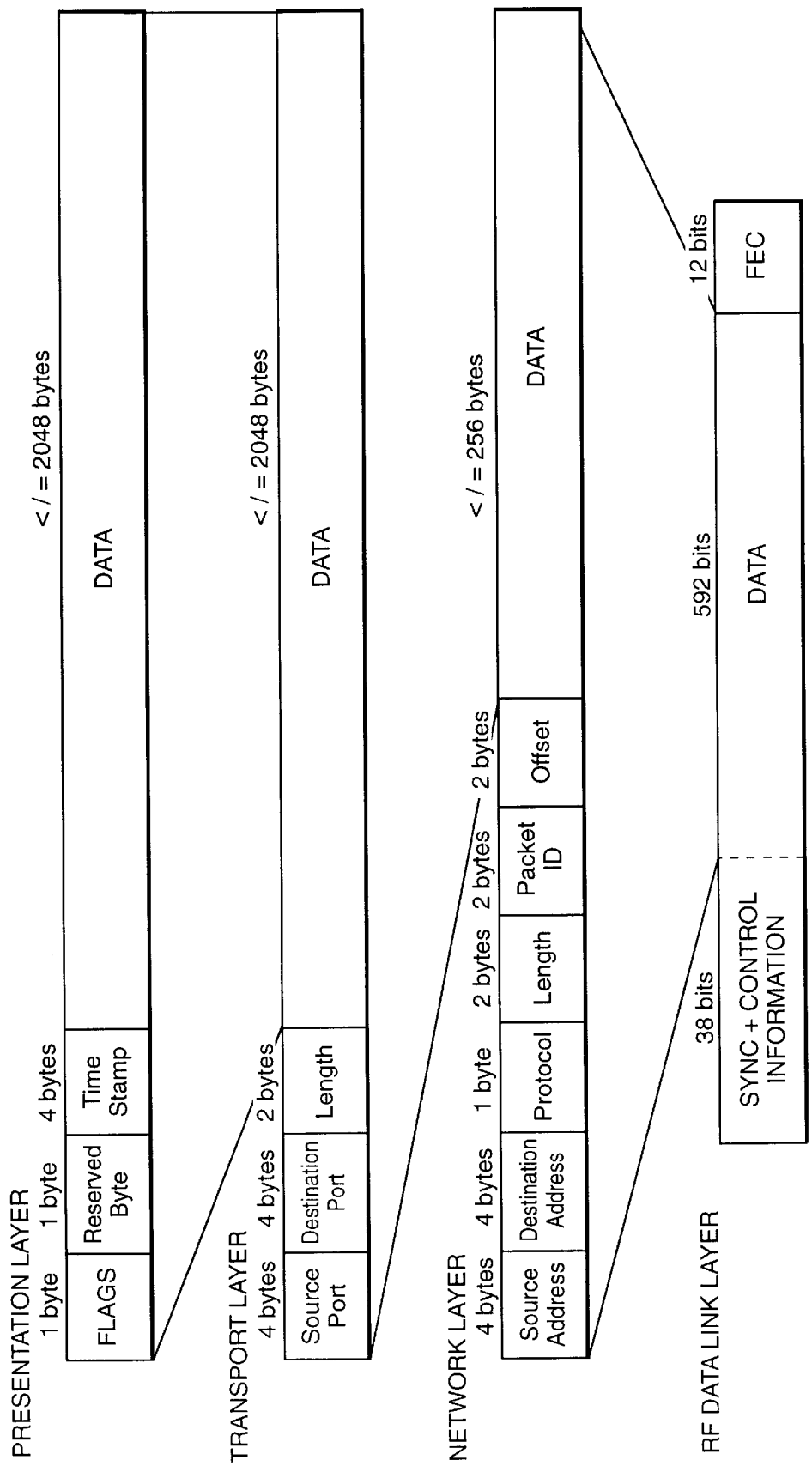
FIG. 6 shows the protocol layers for an interactive-video data system according to the invention.

FIG. 6 shows the data units, or frames, for the various protocol layers of the system based upon the TCP/IP protocol suite for an interactive-video data system according to the invention. These frames are shown for a presentation layer, a transport layer, a network layer, and a datalink layer. As indicated by the dotted lines, higher-level frames are encapsulated in the data information field of a lower-level frame. Each frame includes data information bytes and various other bytes as indicated in the Figure.

Figures 7, 8:
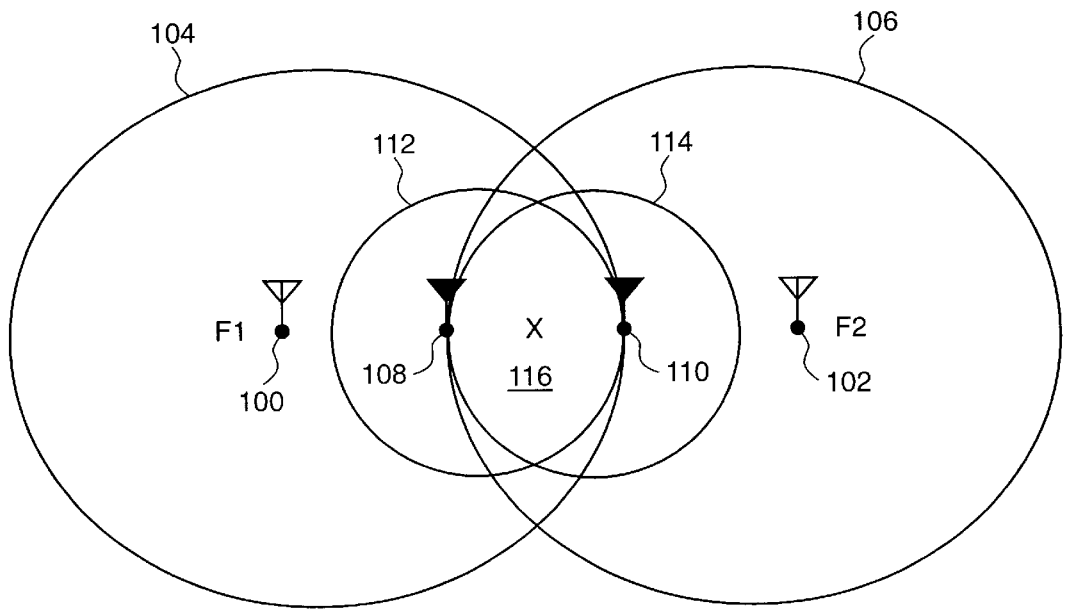
FIG. 7 is a diagrammatic view of two adjacent cell CTSs with overlapping coverage areas.
FIG. 8 is a chart showing the frequencies used by two adjacent cell CTSs.

FIG. 7 is a diagrammatic view of two adjacently located cell CTSs 100, 102. These CTSs are similar to the base cell station 16 described in connections with FIGS. 1, 2, 5. These CTSs are each shown with antennas for RF transmitter operation at 218–219 MHz. The RF transmitter coverage area, or cell, for the cell CTS 100 is represented by the circle 104. Similarly, the RF transmitter coverage area, or cell, for the cell CTS 102 is represented by the circle 106. Associated with the CTS 100 is a remote receiver unit 108 which has a receive-only RF antenna. Similarly, associated with the CTS 102 is a remote receiver unit 110 which has a receive-only RF antenna. The remote receiver unit 108 receives RF signals from RTUs located within an area, or cell, defined by the circle 112. Similarly, the remote receiver unit 110 receives RF signals from RTUs located within an area, or cell, defined by the circle 114. An area 116 is defined as overlap area in which is simultaneously covered by all of the coverage areas for the CTSs 100, 102 and the remote receiver units 108, 110. A number of these areas may exist for each CTS of a network.

The signaling protocol for a system according to the invention used time-division-duplexing. In the Broadcast Mode, an outbound signal sends information from a network switching center, or hub, via a satellite link to a CTS, and then to a RTU. In the Response Mode, an inbound signal sends response information from a RTU to a remote receiver unit, then to a CTS, and then via a satellite link back to the switching center, or hub.

FIG. 8 is a chart showing the various frequencies used by the two adjacent cell CTSs 100, 102 and their respective intermediate receivers. For CTS 100 the broadcast frequency is frequency F1. The setup frequency for remote receivers associated with the CTS 100 is F1. The respective remote receivers associated with the CTS 100 receive data from the subscribers units on frequencies F2–F14.

For CTS 102 the broadcast frequency is frequency F2 and for base cell station 102, the broadcast frequency is F2. The setup frequency for remote receivers associated with the CTS 102 is F2. The respective remote receivers associated with the CTS 102 receive data from the subscribers units on frequencies F3–F14 and F1.

RTUs located in the region of overlapping coverage 116, which are located between the two CTSs 100, 102 receive signals of approximately equal strength from each of the CTSs. If each of the CTSs is permitted to randomly start their broadcast transmissions, interference results if one CTS is in the Broadcast Mode and if the other CTS is in the Response Mode attempting to listen to a response from a RTU on the same frequency.

Figure 9:
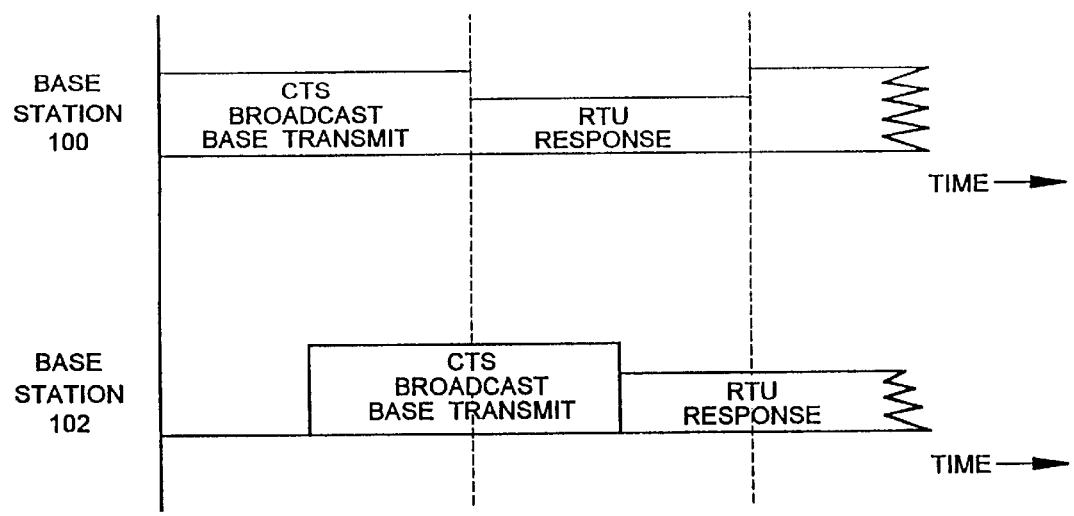
FIG. 9 shows respective timing charts for two unsynchronized, adjacent cell CTSs.

FIG. 9 shows respective timing charts for two unsynchronized, adjacent cell CTSs 110, 102. If data is received by RTUs in the overlap region 116 of FIG. 7, the intermediate receiver 108 receives signals from the CTS 110 on F2. The intermediate receiver 108 also receives signals from other RTUs on F2 resulting in severe interference.

If RTUs located in the overlap region 116 of FIG. 7 all receive signals from CTS which are synchronized, for example, to the timing scheme shown in FIG. 9 for the CTS 100, then interference at the remote receivers and RTU's due to lack of synchronization can be eliminated.

This is accomplished by using a Global Positioning System GPS system to synchronize all CTSs. In order to reduce interference and to maximize the reuse of the various RF channel frequencies, all of the CTSs are synchronized using a GPS receiver at each CTS to provide a precisely synchronized time stamp at each CTS. The prior system discussed has a timing accuracy of 50 milliseconds±20 milliseconds. With a system according to the invention, timing accuracy of 1 to 4 microseconds is achieved.

Using the Global Positioning System (GPS), a precise time stamp is made locally available at each CTS to synchronize a system according to the invention. By synchronizing the start-of-transmission time for all of the CTSs in the system, interference between adjacent CTSs at remote receivers and RTU's is avoided.

Figure 10:
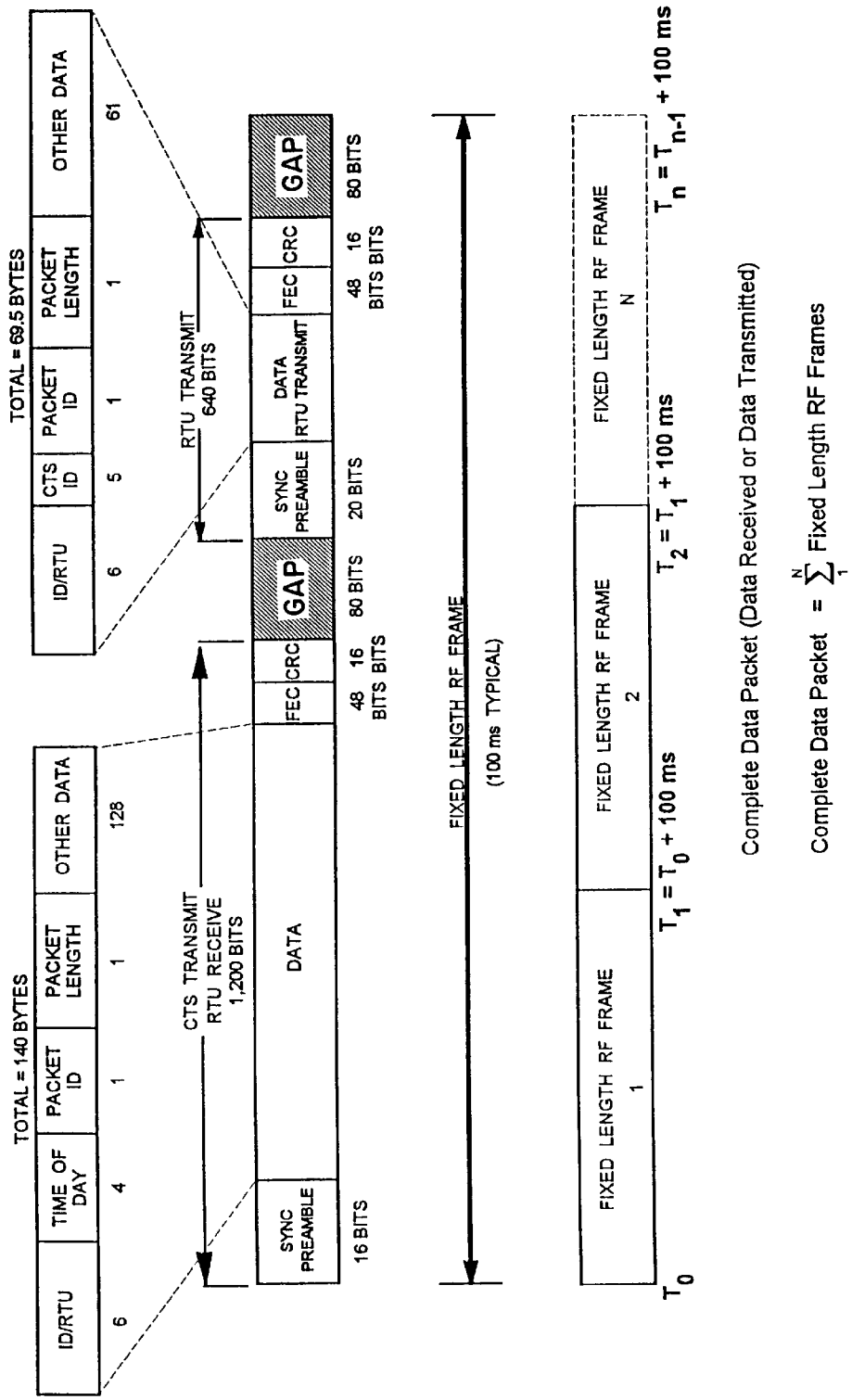
FIG. 10 is a signal diagram showing data pulses and also showing the data pulses on an enlarged scale.

FIG. 10 shows a typical message protocol for a fixed length message frame of 230 bytes of eight bits. This fixed frame length is important in minimizing access time to the system under peak load conditions, since there will be substantially no dead air time incurred while a subscriber is awaiting to be connected or disconnected. Various functional categories are typically included in the broadcast as shown in the blocks. Of note is the RTU, RTU ID section which addresses the unit to be activated (similar to a telephone number), and the Packet ID byte for accumulating a sequence of home unit response frames into a packet. All messages and protocol are consistent with the transmission of data implicitly as part of a video message during the vertical blanking interval or transmission over a digital r-f link parallel to a video channel. However, as will be more particularly set forth later, it is pertinent to synchronize timed data within the nationwide system, even taking into account differences in travel time of radio waves (see U.S. Pat. No. 4,591,906), and for this reason the technique described in U.S. Pat. No. 4,755,871, Jul. 5, 1988 for Control of RF Answer Pulses in a TV Answer Back System may be used to synchronize transmissions with the TV carrier signal from the cell site transmitter and to organize all the multiplexed timing slots for avoiding idle on-air time. Thus, this system departs from any former telephone switching system art which is asynchronously switched.

With reference to FIG. 11, the nationwide transmission of messages from the individual subscriber home units longer than 640 bits require several frames of data, with accumulation into packets. The cell site transmission system shown in FIG. 11 thus processes a set of packets in the manner shown in the Figure in order to accumulate subscriber messages of variable length into a set of serial transmissions for transmitting to the satellite at higher transmission frequency. Accordingly, packet builder circuits (typically shown as 150, 151) are individually assigned to each one of a group of simultaneously active remote receiver units until the RTU's variable length message of n 640 bit frames is completed. After pricing in a pricing module 152, the messages are assembled in a module 153, synchronously timed in a module 154, and transmitted to a satellite 155. These accumulated messages are received at the central data station of the hub for switching, adding pertinent subscriber data and a receiving address and retransmitting over the satellite at a receiving point, such as a further subscriber or a service provider.

Figure 12A:
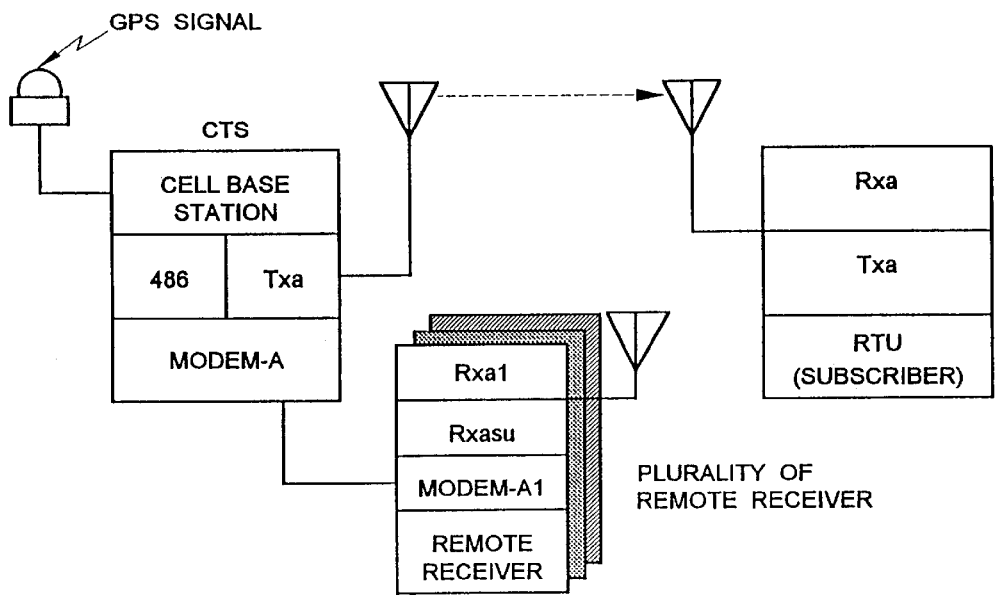
FIG. 12A is a block system diagram of communication channels at the base cell site.
Figure 13:
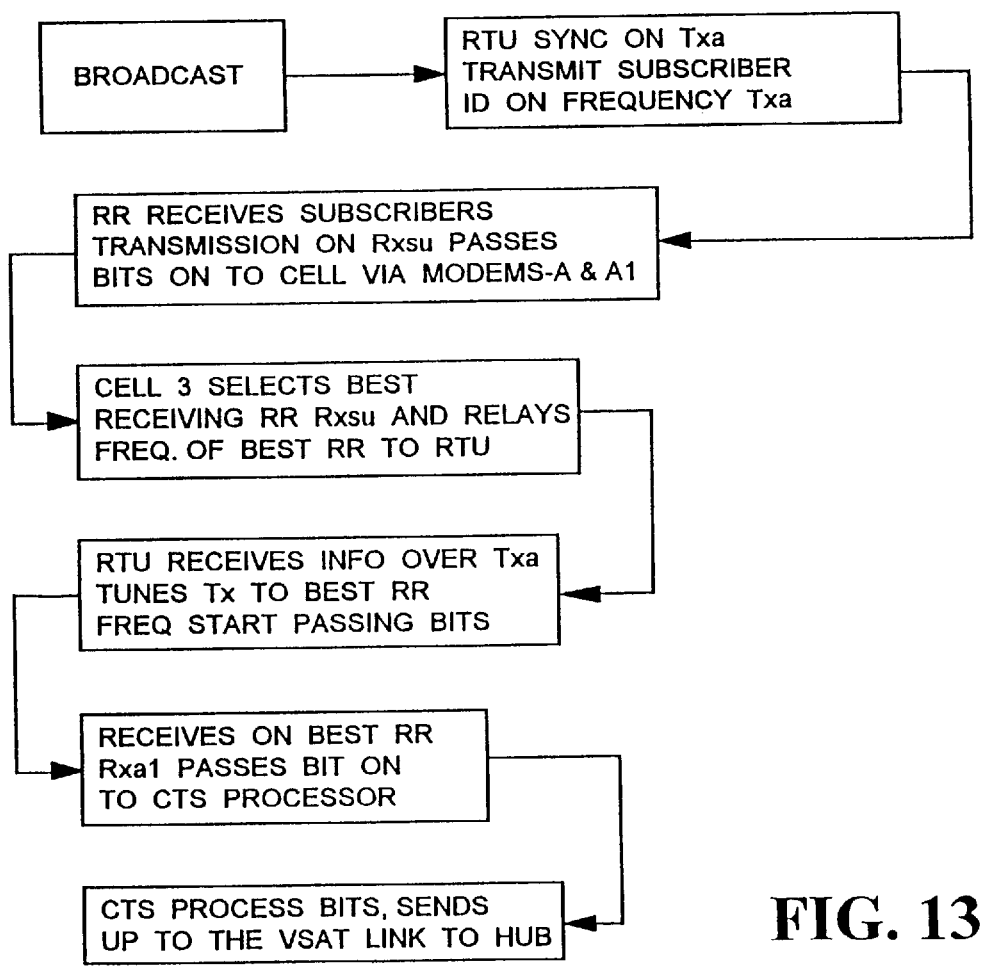
FIG. 13 is diagrammatic system flow diagram for transmitted messages between local subscribers the cell data center and the satellite connected network of cell sites for the system of FIG. 13.

FIGS. 12A and FIG. 13 relate to the communication sequences within the limits of a local CTS 16, as defined by the outer dotted ring 50 of FIG. 2. The sequences are between subscriber, or home units, 12, the CTS 16, and remote receiver units 18 Note that the RTU 12 is also designated as an interactive data appliance (IDA). An IDA is a general term which includes subscriber video stations, digital alarms, or the like, and mobile units.

Figure 12B:
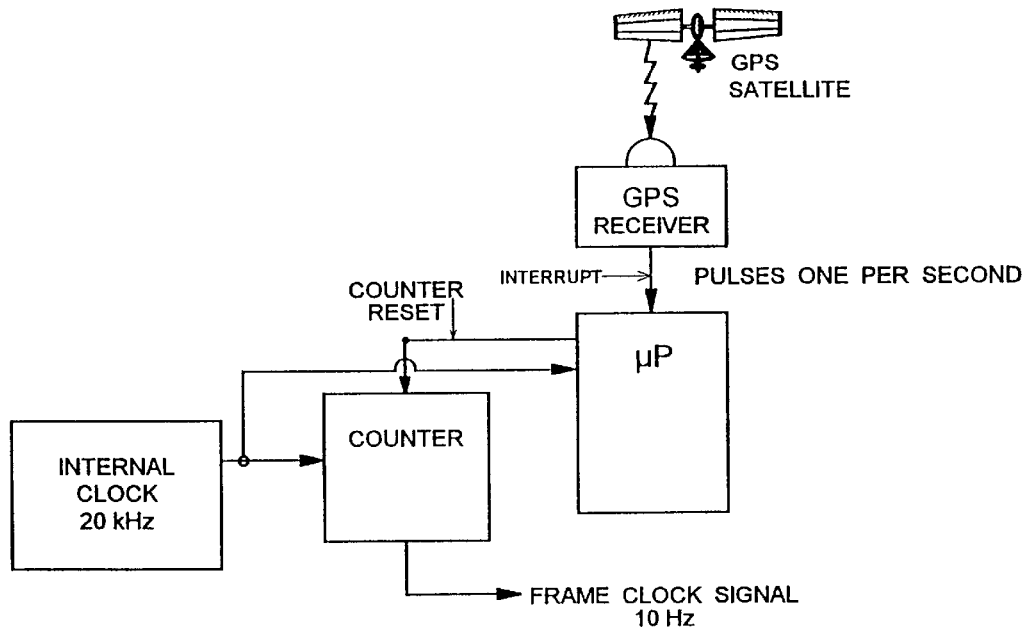
FIG. 12B is a block system diagram showing synchronization with a GPS time stamp of the start time for transmission of data from the local CTS to RTUs.

FIG. 12B schematically shows synchronization with a GPS time stamp of the start time for transmission of data from the local CTS to the RTUs.

Figure 12C:
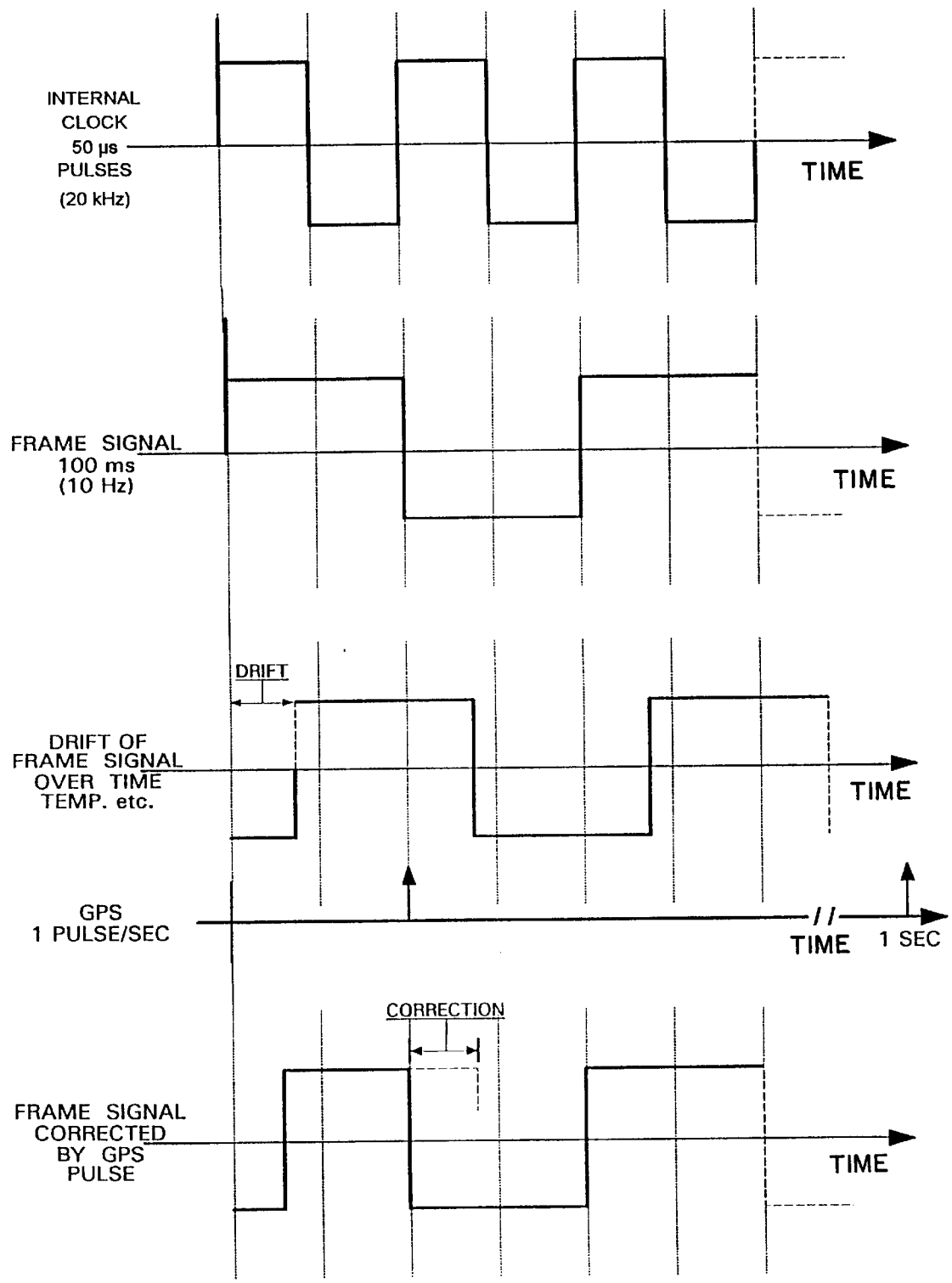
FIG. 12C is a timing diagram showing how synchronization with a GPS time stamp of the start time for transmission of data from the local CTS to the RTUs avoids interference with adjacent CTSs or RTUs timed to the adjacent CTSs.

FIG. 12C shows a timing diagram illustrating how synchronization with a GPS time stamp of the start time for transmission of data from the local CTS to the RTUs avoids interference with adjacent CTSs or RTUs timed to the adjacent CTSs.

Note that the data flow chart of FIG. 13 relates to a "set-up" and response sequence of intercommunications between the respective RTUs 12 or IDAs, remote fixed-station remote receiver units 18, 19, and the CTS 13. Synchronization is controlled by modulation of the carrier frequency $Tx_a$ module of the CTS transmitter upon which the RTU 12 locks. Then the RTU 12 initiates a response which includes both the subscriber identification code (ID) and the CTS ID for the purpose of facilitating handoff between CTSs with mobile units or between fringe area cells.

The remote receiver 18, 19 receives the RTU's transmission on its frequency $Rx_{su}$, and passes an acknowledgment to the CTS cell 16 for sampling transmission and auditing the transmission routing. Thus CTS 16 selects the remote receiver unit that receives the best subscriber signal. Note that the remote receiver unit 18 receives both the transmissions from the CTS transmitter frequency at $Rx_{a1}$ and the communications at its assigned frequency $Rx_{su}$, and similarly the RTU 12 transmits on two alternative frequencies, one tuned to a particular remote receiver unit frequency.

The CTS 16 then relays the best frequency back to the RTU 12 for tuning in and finishing communications with the best and only remote receiver unit (assumed to be 18). This is the end of the "set up" period and the start of the transmission period, during which the message bits are relayed to the CTS 16 by the tuned-in intermediate receiver 18. The message bits are processed in the CTS 16 and relayed into the network to the central data hub 14 via the VSAT link.

Note that the gap 86 (with reference to FIG. 3) between the CTS 16 broadcast interval 82 and the subscriber, or home, unit response interval 80 is used for the set up function so that a single frame period covers the procedure of FIG. 13 through the sending of a single frame of the message from the RTU. If transmission conditions change, a succeeding packet from a subscriber thus could be transmitted from a different remote receiver at a different frequency. Thus the packet ID byte portion of FIG. 10 is significant for reassembling the message frames into a single message packet (also identified). The arbitrary cell identification number is similar to a telephone exchange area code designation in the identification of the CTS or the subscriber's complete ID address.

This set up procedure is important for "hand-off" of a mobile unit from one stationary remote receiver unit site to another as fringe areas are encountered, such as at borders between two intermediate receiver activity zones, represented by the circles 112, 114 of FIG. 7. Similarly the mobile units can move from CTS to CTS when adjacent cells are present such as in urban areas, requiring similar hand-off procedure. The hand-off may be initiated in different ways.

As above described, the CTS 16 may initiate the hand-off of a subscriber 12 from an intermediate receiver in one zone to-another in a different zone within the subdivided CTS. Thus a signal strength (RSSI) measurement may serve as a criterion for hand-off, with the CTS 16 directing the subscriber into a set-up routine when signals falling below a threshold, −80 dBm for example, are encountered. Since the RTU 12 stores the message data, it is retained until the set-up procedure is completed in about 2 seconds.

Alternatively the RTU software may cause the RTU 12 to place itself in a set-up routine when the RSSI goes below a chosen threshold value, so that the RTU response is transmitted only after set-up with a satisfactory CTS or CTS subdivision zone connection of proper signal strength.

When the RTUs 12 are transportable from cell to cell, the packets provide according to FIG. 11 should be sorted at the data processing center of the hub 4 rather than at the CTS 16 level. Each packet carries an identification of the subscriber for this purpose and the packet ID is carried in the broadcast frame of FIG. 11 for such processing. Thus at the central hub 14 a packet of three frames could be derived from two different cells, generally adjacent in geographical relationship. Note the cell ID in the subscriber's transmissions (FIG. 11), which is used for control purposes.

Also with reference to FIG. 7, the possibility of fringe hand off errors or interfering signals between CTSs is avoided by the allocation of different transmission frequencies for communicating with the geographically adjoining intermediate receiver stations in the adjacent CTS areas (104, 106). Thus, in the vicinity of overlapping CTS regions, the related frequencies $f_x$, $f_y$ assigned to adjacent intermediate receivers 108, 110 may avoid interference problems between intermediate receiver stations in different adjacent CTS territories.

Figure 14:
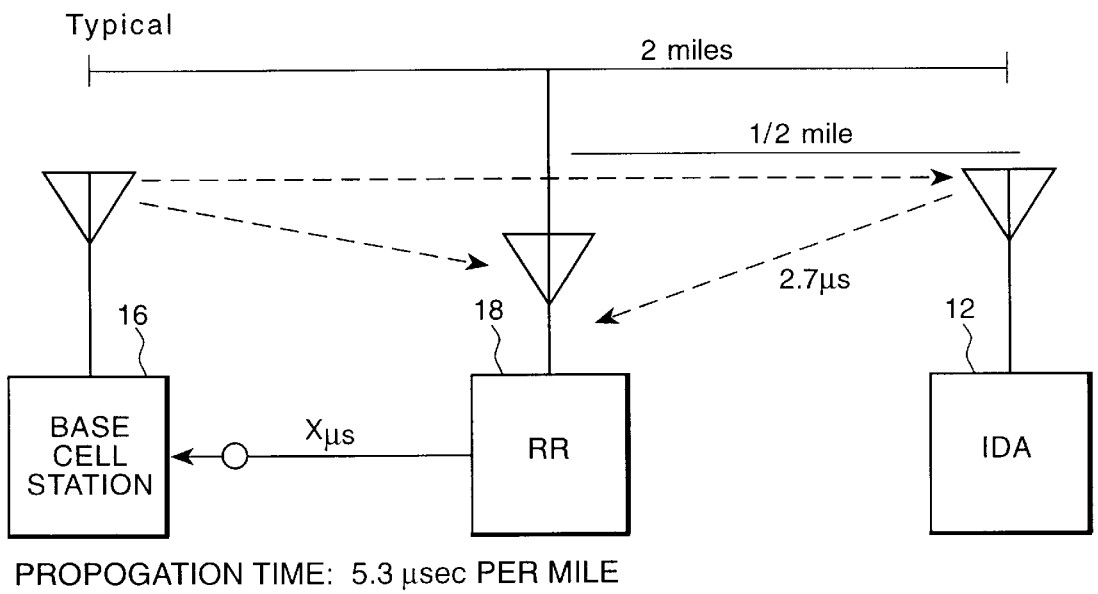
FIG. 14 is a block diagram illustrating transit time characteristics of messages at a base cell site,.
Figure 15:
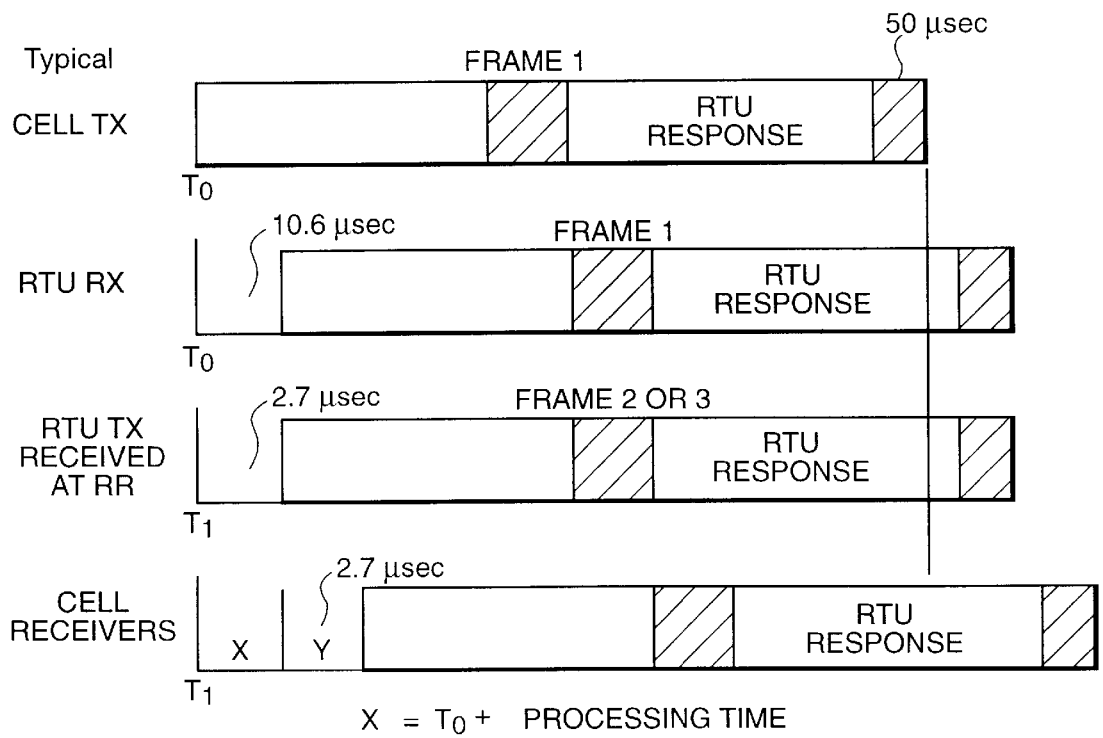
FIG. 15 is a diagrammatic view of typical communication frames showing relative times at different cell site communication stations for the site of FIG. 14.

With Reference to FIG. 14 and FIG. 15, critical timings in the messages processed within the CTS site (50, FIG. 2) are discussed in relationship to these Figures. A example is shown for a CTS site having a 2 mile radius and an intermediate receiver site having a ½ mile radius. Propagation time is 5.3 microseconds per mile. The intermediate receiver derives bit synchronization and frame synchronization from the signals broadcast by the CTS. The RTU or IDA derives bit synchronization and frame synchronization from signals broadcast from the CTS.

For keeping the message bits accurately synchronized within the system, the delays in transit time of r-f transmissions must be accounted for. Those transit times are noted in FIG. 14, and the transmitted message frame timings are set forth in FIG. 15. The frames are sequentially separated by a 4 millisecond guard band.

There is an approximate 2.7 microsecond delay between the subscriber (IDA) 12 and the closest intermediate receiver station 18, which in one of approximately ten such receivers distributed about the coverage area of the CTS. This delay is less than 6% of the 50 microsecond signal pulse width and thus no range adjustment is needed for that propagation induced delay. The CTS 16 thus adjusts its synchronization with system timing of the received IDA responses after accounting for the approximately two times 10.6 microsecond (average) delay time for the transmissions to IDA 12 and back to the CTS 16.

Figure 16:
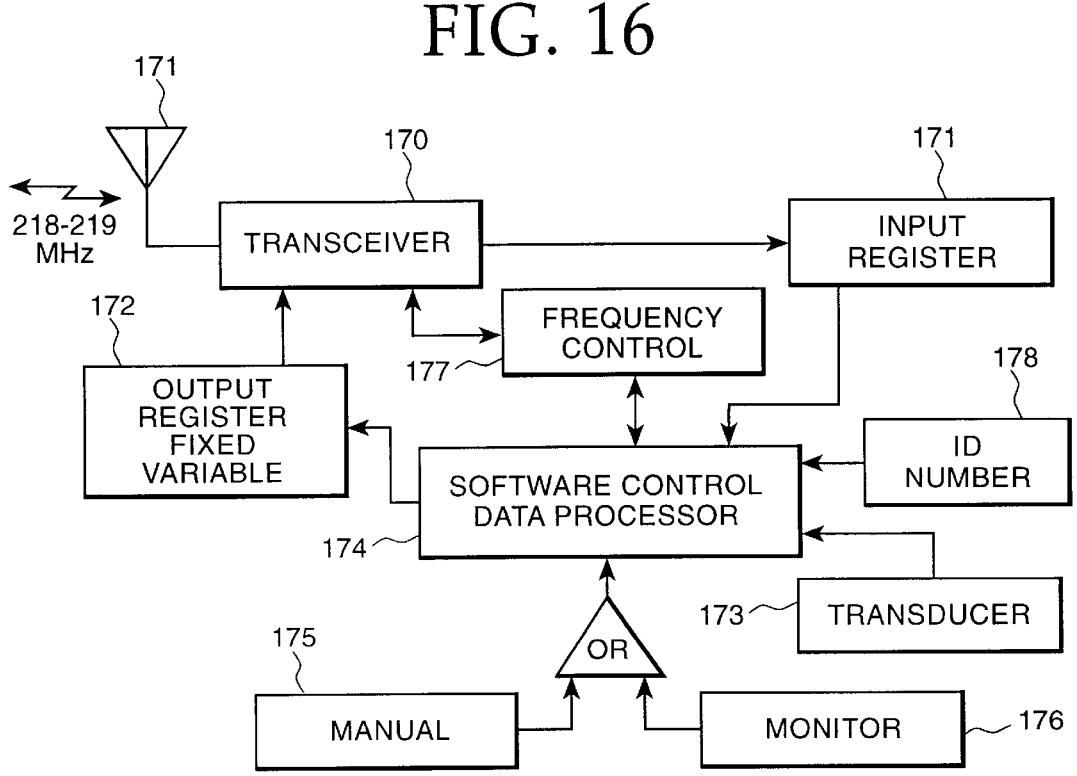
FIG. 16 is a block circuit diagram of RTUs for digital fixed or mobile communication services.

FIG. 16 illustrates a mobile RTU, which is a simplified digital appliance type, provided by this invention for interactive two-way wireless communications with a CTS system compatible with FCC standards for interactive video data services. In the simplified version of FIG. 16, the transceiver 170 and attached antenna permits two-way wireless communications in the 218–219 MHz band and is compatible with the functions herein before set forth. The double headed arrow notation for the radio waves at the antenna signifies two way wireless communication. For digital communications, an input register 171 is supplied for received digital data. An output register 172 is provided for retaining interactive subscriber entered messages from a transducer 173, which is typically a manual keyboard or a digital sensing instrument. Digital display means may be provided for subscriber viewing of the contents of either one or both registers 171, 172. Thus a data processor 174, by way of suitable software, controls the system with different modes of operation such as a manual control 175 suitable to keyboard inputting of data from a subscriber, or an automatic monitoring control mode 176 for relaying an alarm or an inventory reading at a subscriber's coin operated vending machine or flow meter. A frequency control section 177 serves to monitor and set the transmission carrier frequency during set up procedures for transmission to a most favorable fixed intermediate receiver station. Also it serves as the system clock to synchronize the transmission frequency of digital data pulses with the system by means of locking to the synchronizing pulses of the IVDS CTS. A unique identification number 178 is built into each RTU and serves similar to a telephone number as a screen for incoming messages directed to that RTU and as an identification of the source of messages sent from an individual subscriber. General software control technology for operation of the RTUs and systems of the disclosed system are known in the art as set forth in more detail in the before mentioned prior patents and patent applications.

This interactive data appliance embodiment of the invention provides a number of innovative features and significant advantages, all compatible with operations within the parameters of a nationwide network of FCC licensed local interactive video data service cells, either for interactive communication within the local cell or for interactive communications nationwide over the network. The software controlled data processor makes the utility of the appliance substantially universal in terms of introduction of modes of operation to match with and integrate into machinery or systems and to provide a variety of features for manual control of interactivity by a subscriber. The simplicity of the digital mode of communication makes the unit simple, low cost and small in size for ideal mobility and long life from battery power. It is of major importance to have the ability in an interactive video data service installation for portable movement of a RTU for providing full IVDS service and control communication capabilities.

Figure 17:
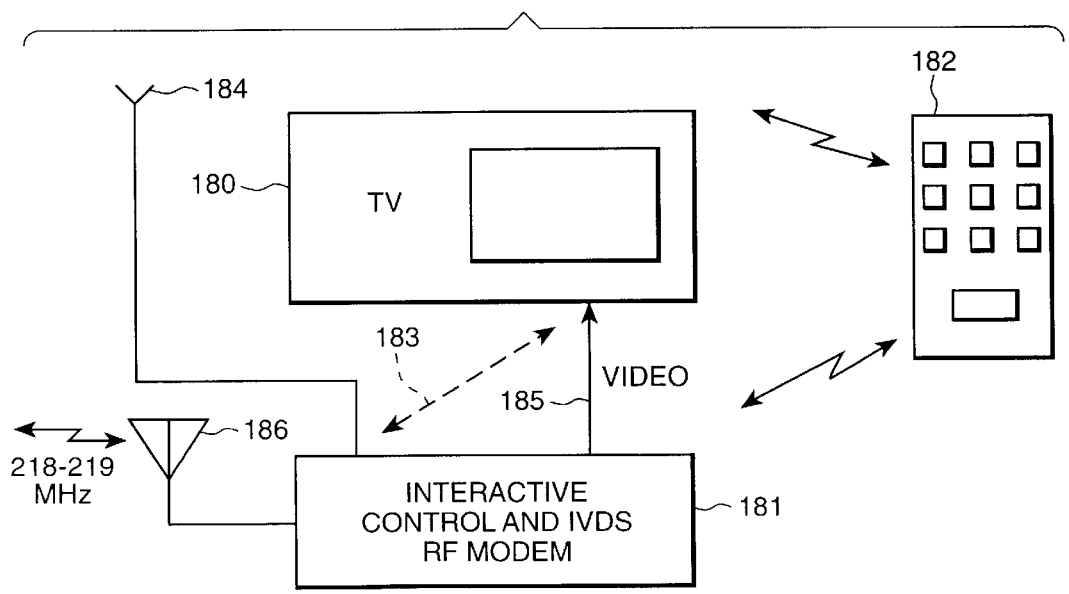
FIG. 17 is a block diagram of an integrated video and digital data service embodiment of the invention.

FIG. 17 illustrates a RTU, which provides a more comprehensive video display type, which provided by this invention for interactive two-way wireless communications with a CTS system compatible with FCC standards for interactive video data services. The embodiment of FIG. 17 provides for interactivity in conjunction with a video display, such as a conventional TV receiver 180. In particular interactivity related to broadcast television programs is provided.

An interactive control unit and a IVDS RF modem 181 is also provided. A manual control unit 182 controls the TV receiver 180 and also the interactive control unit and modem 181, which in this case may be termed a home unit or a RTU. The interactive control unit and modem 181 receives TV or video signals at a terminal 184 from off-air, from a cable, or from another suitable source. Video signals from the interactive control unit and modem 181 are provided through a signal line 185 to the TV receiver 180. The interactive control unit and modem 181 receives 218 MHz RF signals from a CTS and transmits signals to a remote receiver unit using an antenna 186. Thus, a conventional television receiver 180 with a wireless communication link 183 communicates with an interactive data appliance 181 for the type of service described in U.S. Pat. No. 5,101,267, for example.

The portability feature made possible by this invention permits such a unit to be moved next door or put into a car or van for movement within or across CTS boundaries with good digital synchronous communication contact within the nationwide network of cells, the utility of which has not heretofore been known or feasible in interactive video data systems. It is therefore evident from this disclosure that the state of the art is advanced. Accordingly the features of novelty believed descriptive of the spirit and nature of the invention are set forth with particularity in the following claims.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A a two-way interactive video network having a network hub switching center for routing communications from and to a plurality of remote transmitter units (RTUs) at various geographic locations served by a central transmitter station (CTS) that processes digital data modulated on an r-f carrier and transmitted from a plurality of RTUs dispersed over a predetermined CTS geographic area by presenting multiplexed digital data synchronously related to a CTS signal for communication from identified individual RTUs within designated geographic service areas, comprising:

a plurality of RTUs adapted to transmit and receive digital data messages of variable lengths;

a CTS including data processing and transmission facilities for transmitting to a set of local RTUs and receiving from a subset of those local RTUs multiplexed synchronously related digital data messages of variable lengths, said CTS data processing and transmission facilities including:

means for synchronizing said transmission facilities with a precision clock signal derived from an independent precision clock source; and CTS reception means for receiving and processing data messages from said set of local RTUs at that CTS comprising a set of cell subdivision sites partitioned from said CTS geographic area and dispersed over said CTS geographic area, each cell subdivision site having a remote receiver adapted for receiving-only low power digital messages transmitted from local RTUs within range of said remote receiver in said partitioned cell site and for relaying said digital messages to said CTS, wherein each RTU is adapted to communicate with said CTS by way of digital data signals of variable lengths synchronously related to said precision clock signal and timed for said multiplexed message transmission.

2. The network of claim 1 wherein the two-way communication interactive video network operates in conjunction with a source of video signals and wherein said CTS data processing and transmission facilities includes means for synchronizing said transmission facilities with a precision clock signal which is derived from a precision clock source, which clock source is independent of said video signals.

3. The network of claim 2 wherein the precision clock source includes means for providing said precision clock signal from a Global Positioning System (GPS) network to provide precision timing for said CTS transmission facilities.

4. The network of claim 3 wherein CTS data processing and transmission facilities include means for receiving signals from a Global Positioning System (GPS) satellite to provide said precision clock signal for precision timing of said CTS transmission facilities.

5. The network of claim 1 further comprising means for transmitting messages from different subdivided cell areas on different carrier frequencies.

6. The network of claim 1 further comprising a transmitter for conveying messages from said CTS to said RTUs on a carrier frequency of substantially 218 MHz.

7. The network of claim 1 wherein each of said local RTUs is individually identified by reception and transmission of digital signal pulses in a predetermined timing relationship synchronized with said precision clock signal.

8. The network in claim 1 further comprising receive only stations in said cell subdivision sites, and means for operating the CTS and RTUs to hand-off a communication message for transmission over a path through a single one of said cell subdivision receive-only stations.

9. The network of claim 8 further comprising RTUs operable to transmit on a plurality of frequencies, and receive-only receivers at different subdivision sites operable on different ones of said frequencies.

10. The network of claim 1 which comprises one of a plurality of CTSs in said network, further comprising facilities for handing off communications from a RTU within the CTS geographic area for communication through a network path of a different CTS.

11. A two-way video/data network comprising a plurality of remote transmitter units (RTUs) adapted to transmit and receive digital data messages of variable lengths;

a plurality of central transmitting station data processing and transmission facilities (CTSs) for transmitting to respective sets of local RTUs and receiving from respective subsets of those local RTUs multiplexed synchronously related digital data messages of variable lengths, each CTS including:

means for synchronizing said transmission facilities with precision clock signals derived from an independent precision clock source; and CTS reception means for receiving and processing data messages from respective sets of local RTUs located in a geographic area served by that CTS, said geographic area comprising sets of cell subdivisions sites partitioned from said geographic area served by that CTS, each cell subdivision site having a remote receiver adapted for receiving-only low power digital messages transmitted from respective local RTUs within range thereof; and a network hub switching center communicating with said plurality of CTSs for routing communications from and to a plurality of RTUs at various geographic locations served by said plurality of CTS, wherein RTUs located within each geographic area serviced by said plurality of CTSs are each adapted to communicate with an associated CTS by way of digital data signals of variable lengths synchronously related to said precision clock signal and timed for said multiplexed message transmission.

12. The network of claim 11 wherein the two-way communication interactive video network operates in conjunction with one or more sources of video signals and wherein said CTS data processing and transmission facilities includes means for synchronizing said transmission facilities with precision clock signals which are derived from an independent precision clock source, which clock source is independent of said video signals.

13. The network of claim 12 including means for providing said precision clock signals from a Global Positioning System (GPS) network to provide precision timing for each of said CTS transmission facilities.

14. The network of claim 13 wherein each of said CTS data processing and transmission facilities include means for receiving signals from a Global Positioning System (GPS) satellite to provide said precision clock signal for precision timing of each of said CTS transmission facilities.

15. A point-to-point communication network comprising:
a network hub switching station,
a plurality of central transmitter stations (CTSs),
a satellite station,
sets of remote transmitter stations (RTUs) located in a vicinity of each CTS, and
means for providing for two-way digital communication between two different RTUs by a serial communication path extending through one of said CTSs, said satellite, said network hub switching station, said satellite and back to said one of said CTSs, wherein at least some of said CTSs serve a set of RTUs that are dispersed over predetermined geographic areas and includes
communication means between said RTUs including a set of stationary receive only terminals, which are remote from said CTSs and which are coupled by a communication link with said CTS for conveying transmitted messages from RTUs in a subdivided portion of said geographic area in a vicinity of said receive only terminals to said CTS,
said CTSs including means for synchronizing said transmission facilities with a precision clock signal derived from an independent precision clock source;
said RTUs transmitting signals at a peak power in a milliwatt range, and
data processing means at said CTS for assembling and re-transmitting digital subscriber messages from said RTUs via said satellite to said CTS, said RTUs transmitting on a plurality of frequency bands.

16. The network of claim 15 wherein said two-way communication interactive video/data network operates in conjunction with a source of video signals and wherein said CTS data processing and transmission facilities includes means for synchronizing said transmission facilities with a precision clock signal which is derived from a precision clock source, which clock source is independent of said video signals.

17. The network of claim 16 wherein said precision clock source includes means for providing the precision clock signal from a Global Positioning System (GPS) network to provide precision timing for said CTS transmission facilities.

18. The network of claim 17 wherein CTS data processing and transmission facilities include means for receiving signals from a Global Positioning System (GPS) satellite to provide the precision clock signal for precision timing of said CTS transmission facilities.

19. The network of claim 15 wherein said RTUs are mobile and said CTS includes means to receive messages from said RTUs through a single one of said receive only terminals.

20. The network of claim 15 wherein each-of the receive only terminals receive signals in a different frequency band and the RTUs have means for selecting a transmission carrier frequency in a plurality of the frequency bands.

21. An interactive video data system comprising:
subscribers with mobile RTUs and facilities for communicating from the RTUs when moved through different geographic zones, said RTUs being adapted to transmit signals on a plurality of frequencies,
a CTS associated with a defined geographic area for serving a set of said RTUs located in said geographic area, wherein said area is subdivided into a plurality of zones, and receive only stations are located in said zones for receiving transmissions from RTUs located in said respective zones each receive only station having a unique reception frequency for receiving communications from the RTUs, said CTS including:
a transmission facility for transmitting messages to said mobile RTUs and reception facility for receiving messages from said receive only stations, and
means for synchronizing said transmission facilities with a precision clock signal derived from an independent precision clock source,
wherein said transmission facility causes said CTS to transmit a signal having a plurality of frames, each frame of said signal being defined by a broadcast interval during which said data is transmitted to said RTUs, a response interval during which no data is transmitted by said CTS, and a gap between said broadcast interval and said response interval, and
wherein said CTS and RTUs include means for handing off communications between zones when communicated signals deteriorate below a given threshold by causing said RTUs in said geographic area to lock onto a signal transmitted on a first carrier frequency by said CTS serving said geographic area, causing said RTU to transmit a subscriber ID code and a CTS ID to a plurality of receive only stations, causing said CTS to select a receive only station receiving a best signal from said RTU for communication with said RTU, and causing said CTS to transmit a signal via said first carrier frequency to said RTU identifying a second frequency which said RTU is to use for further transmission to said selected receive only station corresponding to said unique frequency associated with said selected receive only station, and wherein functions associated with said handing off procedure take place during said gap.

22. The interactive video data system of claim 21 wherein said two-way communication interactive video network operates in conjunction with a source of video signals and wherein said CTS data processing and transmission facilities includes means for synchronizing said transmission facilities with a precision clock signal which is derived from a precision clock source, which clock source is independent of said video signals.

23. The interactive video data system of claim 22 wherein the precision clock source includes means for providing said precision clock signal from a Global Positioning System (GPS) network to provide precision timing for said CTS transmission facilities.

24. The interactive video data system of claim 23 wherein CTS data processing and transmission facilities include means for receiving signals from a Global Positioning System (GPS) satellite to provide said precision clock signal for precision timing of said CTS transmission facilities.

25. The interactive video data system of claim 21 further comprising means for transmitting messages from different zones on different carrier frequencies.

26. The interactive video data system of claim 21 further comprising a transmitter for conveying messages from said CTS to said RTUs on a carrier frequency of substantially 218 MHz.

27. The interactive video data system of claim 21 wherein each of said local RTUs is individually identified by reception and transmission of digital signal pulses in a predetermined timing relationship synchronized with said precision clock signal.

28. The interactive video data system in claim 21 further comprising receive only stations in said cell subdivision sites, and means for operating the CTS and RTUs to hand-off a communication message for transmission over a path through a single one of said cell subdivision receive-only stations.

29. The interactive video data system of claim 28 further comprising RTUs operable to transmit on a plurality of frequencies, and receive-only receivers at different subdivision sites operable on different ones of said frequencies.

30. The interactive video data system of claim 21 which comprises one of a plurality of CTSs in said network, further comprising facilities for handing off communications from a RTU within the CTS geographic area for communication through a network path of a different CTS in the area of overlap geographically between the two different CTSs.

31. A point-to-point communication network comprising:
   a network hub switching station,
   a plurality of central transmitting stations each having a transmitting facility for transmitting messages,
   a satellite station,
   a plurality of sets of subscriber units located in a vicinity of each central transmitting station adapted to receive said messages transmitted by an associated network hub switching transmitting station,
   means for providing two-way digital communication between two different subscriber units by a serial communication path extending through one of said plurality of central transmitting stations, said satellite, said central station, said satellite and back to said one central transmitting station,
   wherein at least some of said central transmitting stations serve a set of subscriber units that are dispersed over predetermined geographic areas and include communication means between said subscriber units, including a set of stationary receive only terminals, which are remote from said central transmitting stations and which are coupled by a communication link with said central transmitting station for conveying transmitted messages from subscriber units in a subdivided portion of said geographic area in said vicinity of said receive only terminals to said central transmitting station,
   said central transmitting station including means for synchronizing said transmission facilities with a precision clock signal derived from an independent precision clock source;
   subscriber transmitter units in said subscriber units for transmitting signals at a peak power in a milliwatt range, and
   data processing means at said central transmitting station for assembling and re-transmitting digital subscriber messages from said subscriber units via said satellite to said central transmitting station, said subscriber units transmitting on a plurality of frequency bands.

32. A communication system comprising:
   subscribers with mobile RTUs and facilities for communicating from said RTUs when moved through different geographic zones, said RTUs being adapted to transmit signals on a plurality of frequencies,
   a CTS associated with a defined geographic area for serving a set of said RTUs located in said geographic area, wherein said area is subdivided into a plurality of zones, and receive only stations are located in said zones for receiving transmissions from RTUs located in said respective zones, said CTS including:
   a transmission facility for transmitting messages to said mobile RTUs and reception facility for receiving messages from said receive only stations, and
   means for synchronizing said transmission facilities with a precision clock signal derived from an independent precision clock source,
   wherein said transmission facility causes said CTS to transmit a signal having a plurality of frames, each frame of said signal being defined by a broadcast interval during which said data is transmitted to said RTUs, a response interval during which no data is transmitted by said CTS, and a gap between said broadcast interval and said response interval, and
   wherein CTS and RTUs include means for handing off communications between zones when communicated signals deteriorate below a given threshold by causing said RTUs in said geographic area to lock onto a signal transmitted on a first carrier frequency by said CTS serving said geographic area, causing said RTU to transmit a subscriber ID code and a CTS ID to a plurality of receive only stations, causing said CTS to select a receive only station receiving a best signal from said RTU for communication with said RTU, and causing said CTS to transmit a signal via said first carrier frequency to said RTU identifying a second frequency which said RTU is to use for further transmission to said selected receive only station corresponding to said unique frequency associated with said selected receive only station, and wherein functions associated with said handing off procedure take place during said gap.

33. A two-way interactive video network according to claim 1, wherein at least one of said RTUs is operatively associated with a vending machine so as to provide information indicative of an operating status of said vending machine as said digital data message transmitted from said RTU.

34. A two-way communication network according to claim 11, wherein at least one of said RTUs is operatively associated with a vending machine so as to provide information indicative of an operating status of said vending machine as said digital data message transmitted from said RTU.

35. A point-to-point communication network comprising:
   a network hub switching station,
   a plurality of central transmitter stations (CTSs),
   a satellite station,
   sets of remote transmitter units (RTUs) located in a vicinity of each CTS, and
   means for providing for two-way digital communication between two different RTUs by a serial communication path extending through one of said CTSs, said satellite, said network hub switching station, said satellite and back to said one of said CTSs, wherein at least some of said CTSs serve a set of RTUs that are dispersed over predetermined geographic areas and includes communication means between said RTUs including a set of stationary receive only terminals, which are remote from said CTSs and which are coupled by a communication link with said CTS for conveying transmitted messages from RTUs in a subdivided portion of said geographic area in a vicinity of said receive only terminals to said CTS, said CTSs including means for synchronizing said transmission facilities with a precision clock signal derived from an independent precision clock source;

said RTUs transmitting signals at a peak power in a milliwatt range, and data processing means at said CTS for assembling and re-transmitting digital subscriber messages from said RTUs via said satellite to said CTS, said RTUs transmitting on a plurality of frequency bands, and wherein at least one of said RTUs is operatively associated with a vending machine so as to provide information indicative of an operating status of said vending machine as said digital data message transmitted from said RTU.

36. A point-to-point communication network comprising:

a network hub switching station, a plurality of central transmitting stations each having a transmitting facility for transmitting messages, a satellite station, a plurality of sets of subscriber units located in a vicinity of each central transmitting station adapted to receive said messages transmitted by an associated central transmitting station, means for providing two-way digital communication between two different subscriber units by a serial communication path extending through one of said plurality of central transmitting stations, said satellite, said network hub switching station, said satellite and back to said one central transmitting station, wherein at least some of said central transmitting stations serve a set of subscriber units that are dispersed over predetermined geographic areas and include communication means between said subscriber units, including a set of stationary receive only terminals, which are remote from said central transmitting stations and which are coupled by a communication link with said central transmitting station for conveying transmitted messages from subscriber units in a subdivided portion of said geographic area in said vicinity of said receive only terminals to said central transmitting station, said central transmitting station including means for synchronizing said transmission facilities with a precision clock signal derived from an independent precision clock source;

subscriber transmitter units in said subscriber units for transmitting signals at a peak power in a milliwatt range, and data processing means at said central transmitting station for assembling and retransmitting digital subscriber messages from said subscriber units via said satellite to said central transmitting station, said subscriber units transmitting on a plurality of frequency bands, and wherein at least one of said subscriber units is operatively associated with a vending machine so as to provide information indicative of an operating status of said vending machine as said digital data message transmitted from said subscriber unit.

* * * * *